(12) United States Patent
Lin et al.

(10) Patent No.: US 7,664,325 B2
(45) Date of Patent: **\*Feb. 16, 2010**

(54) FRAMEWORK FOR DETECTING A STRUCTURED HANDWRITTEN OBJECT

(75) Inventors: Zhouchen Lin, Beijing (CN); Junfeng He, Beijing (CN); Zhicheng Zhong, Fujian (CN); Chun-Hui Hu, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 706 days.

This patent is subject to a terminal disclaimer.

(21) Appl. No.: 11/314,554

(22) Filed: Dec. 21, 2005

(65) Prior Publication Data

US 2007/0140566 A1 Jun. 21, 2007

(51) Int. Cl.
*G06K 9/18* (2006.01)

(52) U.S. Cl. ........................ 382/188; 382/179; 382/186; 382/202; 382/282; 715/247

(58) Field of Classification Search ................. 382/180, 382/182, 202, 203; 707/2, 3, 5; 715/209, 715/255
See application file for complete search history.

(56) References Cited

U.S. PATENT DOCUMENTS

| | | | |
|---|---|---|---|
| 5,111,514 A | 5/1992 | Ohta | |
| 5,392,130 A | 2/1995 | Mahoney | |
| 5,701,500 A * | 12/1997 | Ikeo et al. | 715/209 |
| 5,774,584 A | 6/1998 | Matsumoto et al. | |
| 5,787,414 A * | 7/1998 | Miike et al. | 707/2 |
| 6,108,444 A | 8/2000 | Syeda-Mahmood | |
| 6,556,701 B1 | 4/2003 | Chiba et al. | |
| 6,600,834 B1 | 7/2003 | Su et al. | |
| 6,622,134 B1 * | 9/2003 | Sorkin | 706/20 |
| 6,757,870 B1 | 6/2004 | Stinger | |
| 7,415,130 B1 * | 8/2008 | Rundle et al. | 382/101 |
| 2001/0024520 A1 | 9/2001 | Yamaai | |
| 2003/0113016 A1 | 6/2003 | Naoi et al. | |
| 2003/0123732 A1 | 7/2003 | Miyazaki et al. | |
| 2006/0177118 A1 * | 8/2006 | Ibikunle et al. | 382/137 |
| 2006/0256388 A1 * | 11/2006 | Erol et al. | 358/3.27 |
| 2007/0003142 A1 * | 1/2007 | Simard et al. | 382/187 |
| 2007/0092140 A1 | 4/2007 | Handley | |
| 2007/0140565 A1 * | 6/2007 | Lin et al. | 382/203 |
| 2007/0140566 A1 * | 6/2007 | Lin et al. | 382/203 |

FOREIGN PATENT DOCUMENTS

| | | |
|---|---|---|
| EP | 0654750 A2 | 5/1995 |
| EP | 0654763 A1 | 5/1995 |
| EP | 1519280 A2 | 3/2005 |
| EP | 1519300 A2 | 3/2005 |

OTHER PUBLICATIONS

Jain, Anil K. et al., Structure in On-line Documents. Sixth International Conference on Document Analysis and Recognition (ICDAR01), Sep. 2001, pp. 1-5. Seattle, USA.

Zhu, Y. et al., "Optimal Polygonal Approximation of Digitised Curves", IEE, Feb. 1997, pp. 8-14, vol. 144, No. 1, IEE Proc.-Vis. Image Signal Process.

(Continued)

*Primary Examiner*—Gregory M Desire
(74) *Attorney, Agent, or Firm*—Lee & Hayes, PLLC

(57) ABSTRACT

Computer-readable media having computer-executable instructions and apparatuses detect a structured handwritten object is detected in a handwritten document. A primitive structure, which is associated with a set of component objects, is formed. A candidate handwritten object is identified by detecting a corresponding logical structure. A classifier for the candidate handwritten object is determined. Consequently, the candidate handwritten object is validated from the classifier.

20 Claims, 33 Drawing Sheets

OTHER PUBLICATIONS

Lin, et al., "Detection and Analysis of Table of Contents Based on Content Association", Imaging Systems Laboratory Technical Reports, Hewlett-Packard, May 5, 2005, See abstract, figure 2, pp. 4-5, 22 pages total.

* cited by examiner

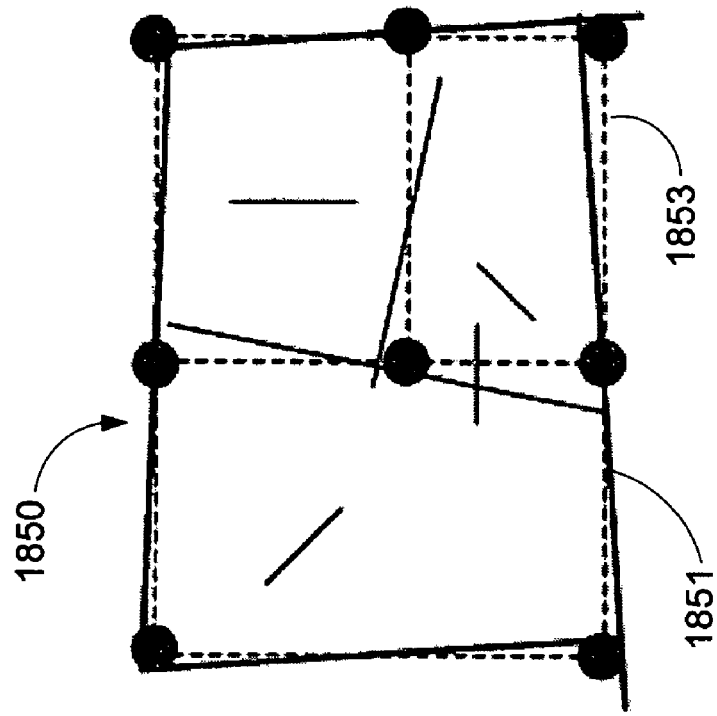
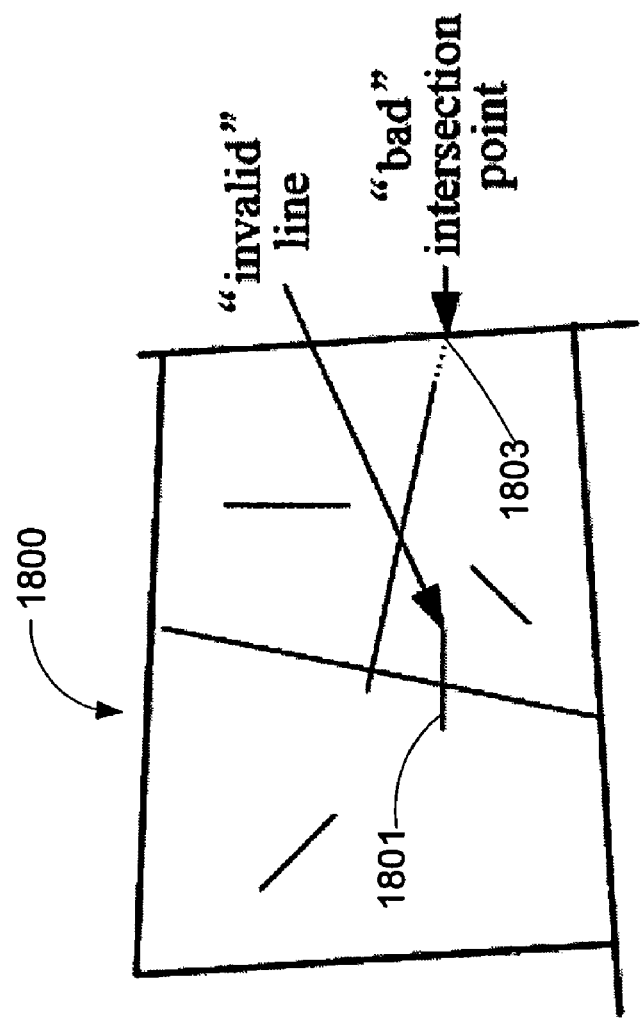
FIG. 18

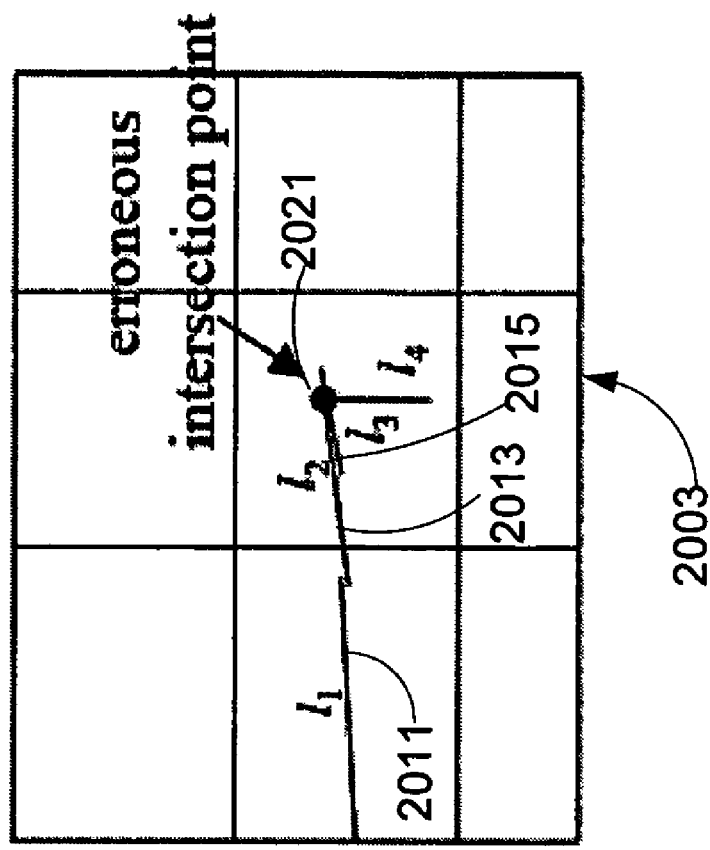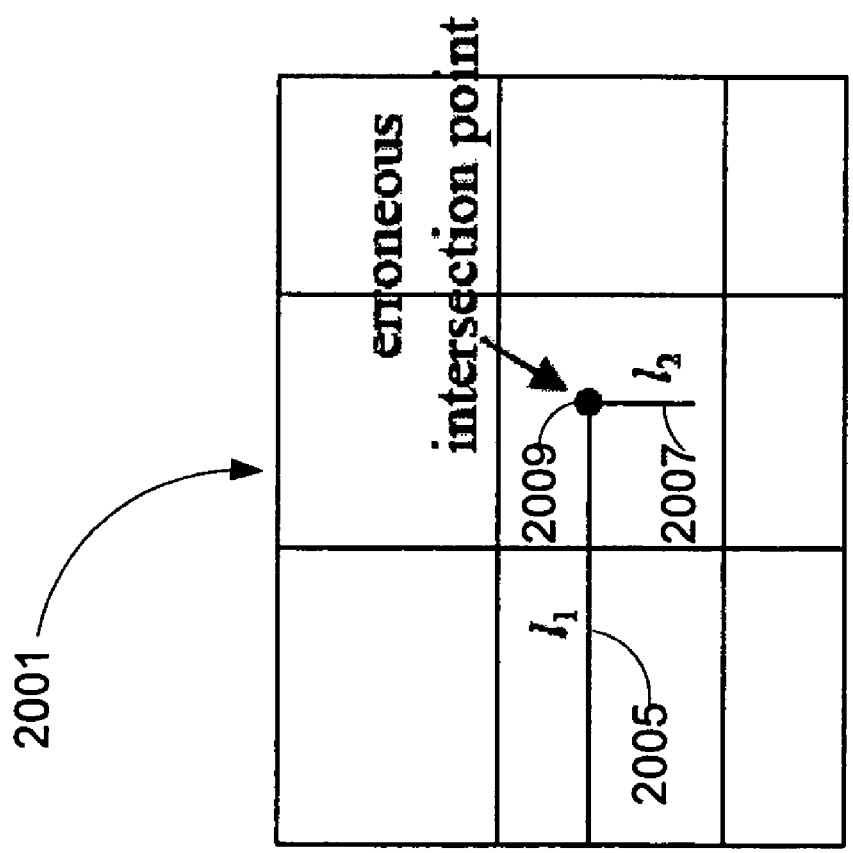
FIG. 20

TABLE 1 Oil spillage: causes and volume for Shell in Delta State, 1991-1994

| | 1991 | | 1992 | | 1993 | |
|---|---|---|---|---|---|---|
| | No. | Volume (Barrels) | No. | Volume (Barrels) | No. | Volume (Barrels) |
| Equipment failure | 32 | 178 | 24 | 126 | 17 | 275 |
| Sabotage | 7 | 26 | 9 | 642 | 13 | 161 |
| Other | 25 | 233 | 19 | 269 | 16 | 58 |
| Total | 69 | 795 | 72 | 1284 | 72 | 617 |

Source: World Bank (1995)  ← 2651 focus on the social perspective of the oil industry restricts us to sabotage for which there are three major reasons:

(i) either because compensation for damage was inadequate, or not paid, or did not reach the community;

(ii) individuals cut flow lines on their property to obtain compensation in excess of the cost of actual damage;

2650

---

TABLE 1 Oil spillage: causes and volume for Shell in Delta State, 1991-1994

| | 1991 | | 1992 | | 1993 | |
|---|---|---|---|---|---|---|
| | No. | Volume (Barrels) | No. | Volume (Barrels) | No. | Volume (Barrels) |
| Equipment failure | 32 | 178 | 24 | 126 | 17 | 275 |
| Sabotage | 7 | 26 | 9 | 642 | 13 | 161 |
| Other | 23 | 233 | 19 | 269 | 16 | 58 |
| Total | 69 | 795 | 72 | 1284 | 72 | 617 |

Source: World Bank (1995)  ← 2601 focus on the social perspective of the oil industry restricts us to sabotage for which there are three major reasons:

(i) either because compensation for damage was inadequate, or not paid, or did not reach the community;

(ii) individuals cut flow lines on their property to obtain compensation in excess of the cost of actual damage;

FRAMEWORK FOR DETECTING A STRUCTURED HANDWRITTEN OBJECT

BACKGROUND

Computer users are accustomed to using a mouse and keyboard as a way of interacting with a personal computer. While personal computers provide a number of advantages over printed documents, users often continue to perform certain functions using printed paper. Some of these functions include reading handwritten documents. In the case of annotations, the printed document assumes a greater significance because of the annotations placed on it by the user. One of the difficulties, however, with having a hand-written document is a later need to have the content entered back into the electronic form of the document. This requires the original user or another user to wade through the handwritten content and enter them into a personal computer. In some cases, a user will scan in the handwritten content and the original text, thereby creating a new document. These multiple steps make the interaction between the printed document and the electronic version of the document difficult to handle on a repeated basis. Further, scanned-in images are frequently non-modifiable. There may be no way to separate the handwritten content from the original text. This makes using the handwritten content difficult. Accordingly, an improved way of handling handwritten content is needed.

With the increasing ubiquity of computers and electronic databases, there is a greater demand for efficient storage, handling, and retrieval of documents in digital form. Documents may be handwritten or machine-generated documents that may be annotated by a user. Correspondingly, tables and other types of handwritten objects are often incorporated within the document. For example, tables are commonly used in a document for describing statistical and relational information. Thus, extraction of handwritten tables plays an important role in document processing. Tables have many applications, including populating databases, which can later be manipulated or queried, or being repurposed into charts.

Detecting and processing handwritten objects is becoming more important with the increasing usage and transfer of electronic documents on computer systems. Enhanced support would help in facilitating office automation.

SUMMARY

A structured handwritten object is detected in a handwritten document. A primitive structure, which is associated with a set of component objects, is formed. A candidate handwritten object is identified by detecting a corresponding logical structure. A classifier for the candidate handwritten object is determined. Consequently, the candidate handwritten object is validated from the classifier.

This Summary is provided to introduce a selection of concepts in a simplified form that are further described below in the Detailed Description. This Summary is not intended to identify key features or essential features of the clamed subject matter, nor is it intended to be used as an aid in determining the scope of the claimed subject matter.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 18 shows normalization of a table frame in accordance with an illustrative aspect of the present invention.

FIG. 20 shows abandoning line segments that are related to an erroneous intersection point in accordance with an illustrative aspect of the present invention.

FIG. 26 shows an example of table detection in accordance with an illustrative aspect of the present invention.

FIG. 27 shows an example of table detection in accordance with an illustrative aspect of the present invention.

DETAILED DESCRIPTION

Aspects of the present invention relate to distinguishing the script type of at least one portion of a writing input.

The following is separated by subheadings for the benefit of the reader. The subheadings include: Terms, General-Purpose Computer, Example of a Handwritten Document, Overview for Detecting Handwritten Tables, Preprocessing, Detecting a Bounding Frame, Quasi-Table Formation, Table Structure Recognition, Analysis of Cell Content, Determination of a Classifier, Structure of a Parse Tree, Experimental Results, Editing after Table Detection, and Framework for Detecting a Structured Handwritten Object.

Terms

Pen: any writing implement that may or may not include the ability to store ink. In some examples, a stylus with no ink capability may be used as a pen in accordance with embodiments of the present invention. An example is Microsoft's Universal Pen (uPen).

Stroke: a temporal series of points that are collected from pen down (or mouse down) to pen up (or mouse up). A stroke may be classified as a drawing stroke or a writing stroke. A drawing stroke is part of a graphical object, while a writing stroke is part of written text.

Segment: a part of stroke that is obtained by cutting the stroke at high-curvature points.

Curvilinear segment: a curved path between two end points on a stroke. A curvilinear segment that approximates an arc may reduce to a line segment when the radius of the arc becomes sufficiently large or the curvilinear segment is sufficiently short.

Quasi-Table: a candidate table formed by a bounding frame and all line segments inside the boundary frame.

Semantic table: a detected table that contains semantic information, such as the structure and the cell content of the table, and hence can be processed by (by porting to) a software application (e.g., Microsoft® Word) using the structure and content of a validated table.

General Purpose Computer

Figure 1:
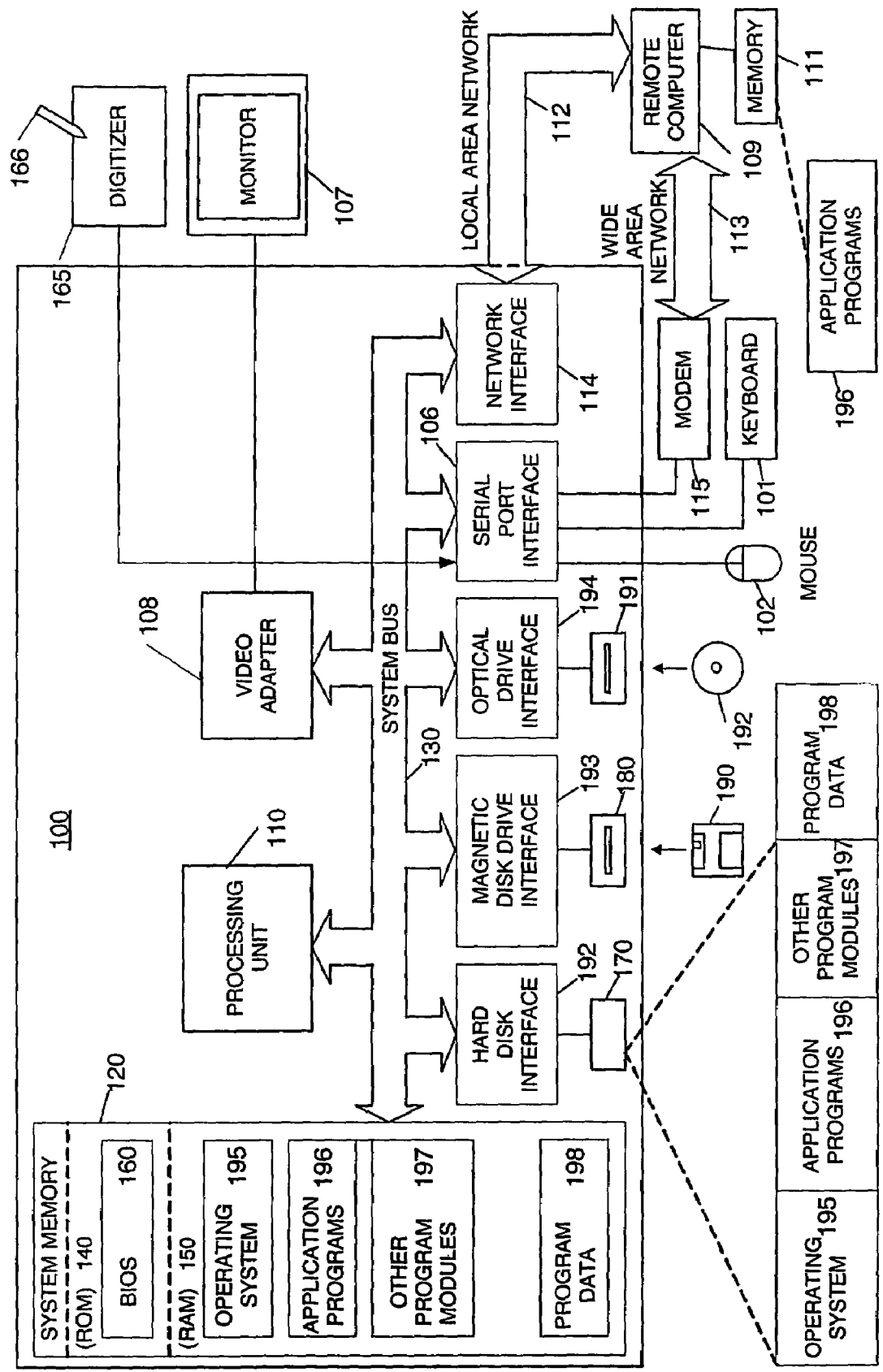
FIG. 1 is a functional block diagram of an example of a conventional general-purpose digital computing environment that can be used to implement various aspects of the present invention

FIG. 1 is a functional block diagram of an example of a conventional general-purpose digital computing environment that can be used to process a writing input from a Pen (e.g., stylus 166). In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

In an embodiment, a pen digitizer 165 and accompanying pen or stylus 166 are provided in order to digitally capture freehand input to provide a writing input (e.g., a handwritten document) for processing unit 110. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

Example of a Handwritten Document

Figure 2:
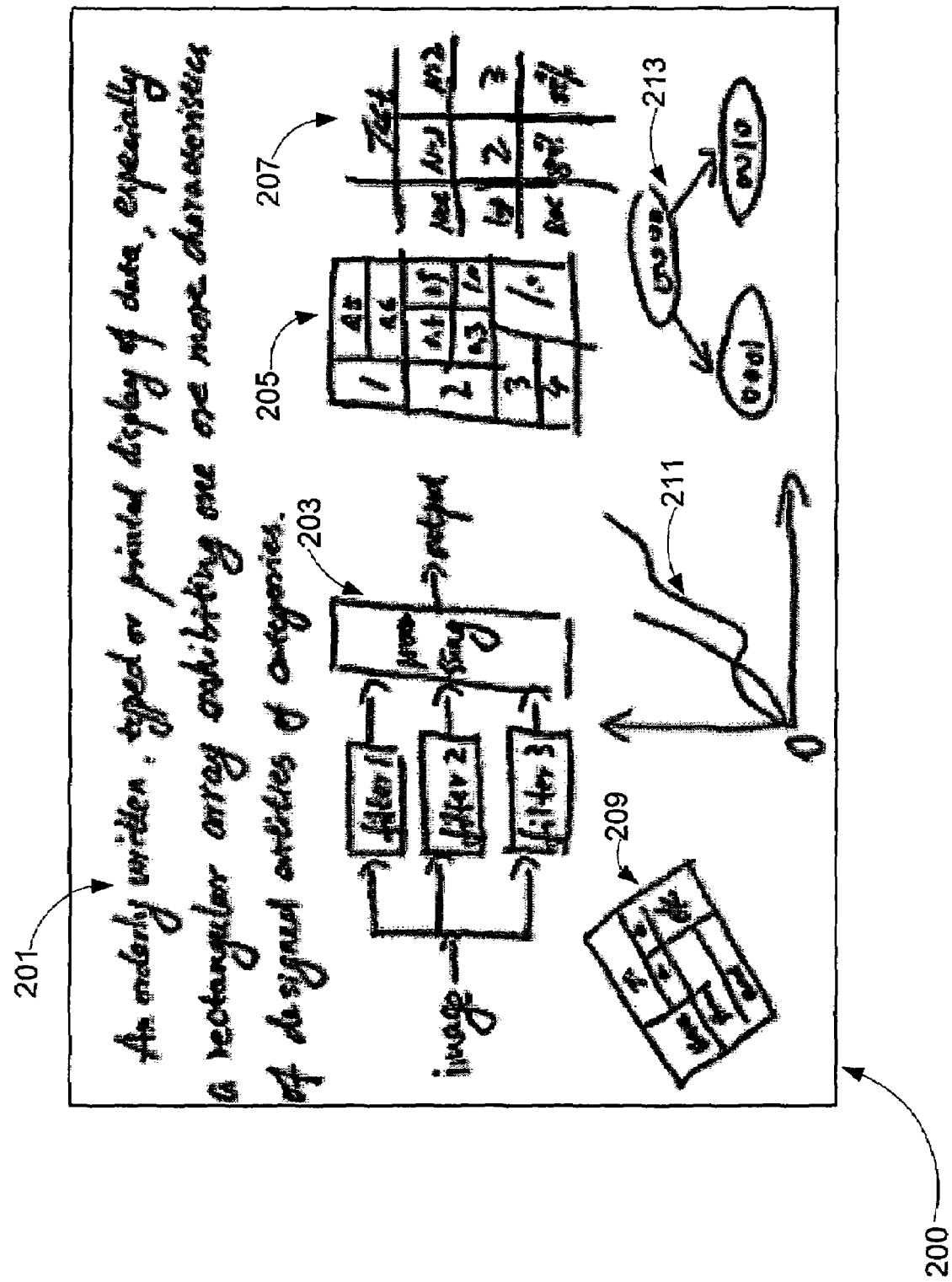
FIG. 2 shows an example of a handwritten document that contains text, charts, graphics, and tables in accordance with an illustrative aspect of the present invention.

FIG. 2 shows a handwritten document 200 that contains various types of structured handwritten objects such as text 201, charts 203 and 213, graphics 211, and tables 205-209 in accordance with an illustrative aspect of the present invention. While handwritten document 200 illustrates only handwritten components, embodiments of the invention also support machine-formatted content that may be annotated with handwritten objects.

Figure 6:
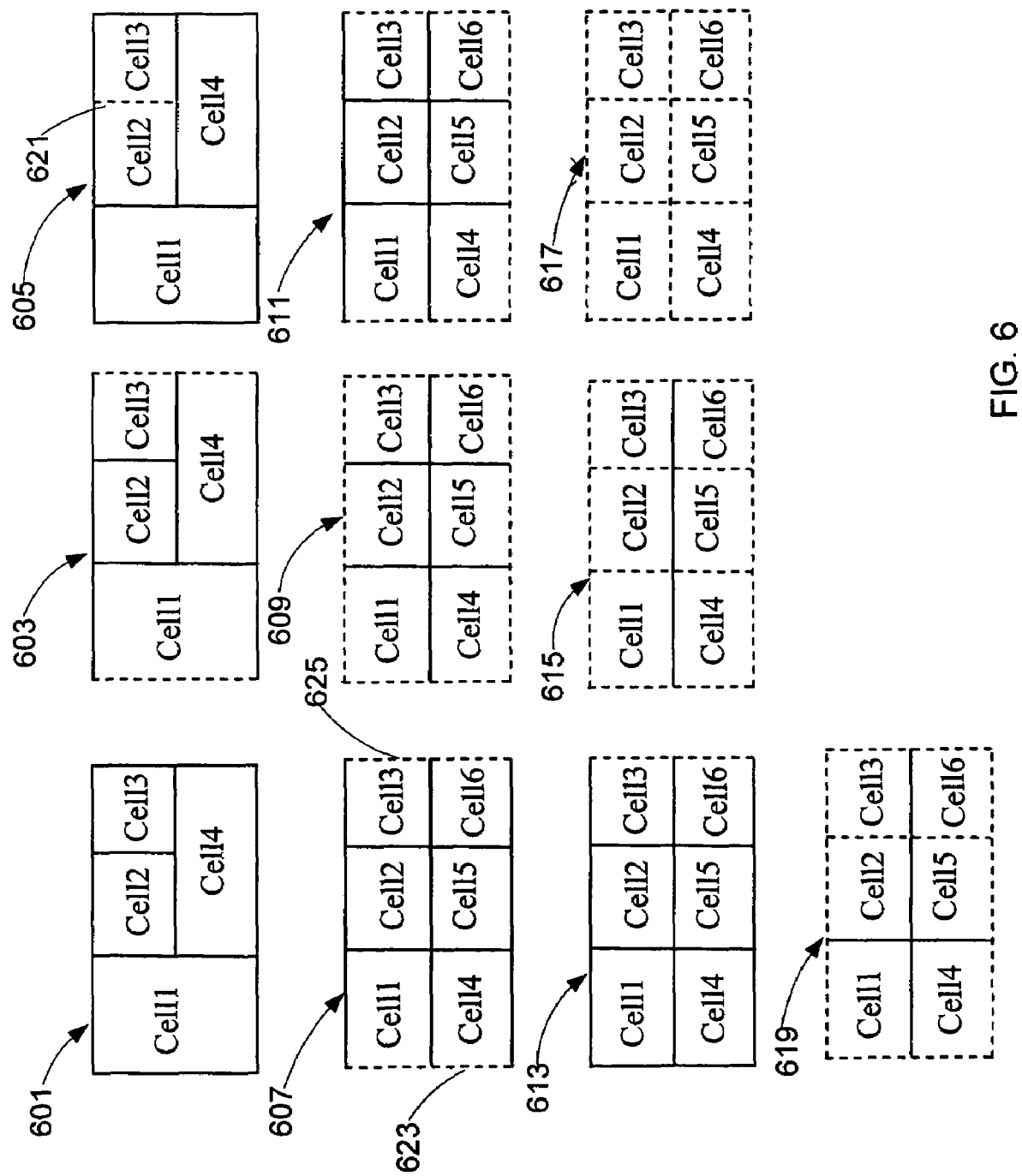
FIG. 6 shows detectable and undetectable tables in accordance with an illustrative aspect of the present invention.

With the introduction of pen-based devices such as Tablet PCs and Electronic Whiteboards, there have been on-line documents, or ink notes, which are of a whole page or even of multiple pages. A typical handwritten document page may contain different drawn entities such as different types of tables (e.g., tables 205-209), charts (e.g., chart 203 and 213), graphics (e.g., graph 211), and text (e.g., text 201) as shown in FIG. 2. Typically, the detection and recognition of handwritten tables in scanned or on-line documents is more difficult to achieve than that in printed documents. For example, the symbols and layout of handwritten tables are often far more irregular and complex than ruled or unruled horizontal tables with a rectilinear structure, i.e., consisting of exactly m columns and n rows. Tables may be closely surrounded or even overlaid by other contents so that table isolation may present additional issues. Handwritten tables may comprise incomplete bounding frames (e.g., table 603 as shown in FIG. 6) and may be drawn with drawing anomalies (e.g., over-traced or concatenated strokes or by skewing the tables as shown in FIGS. 25-31). Moreover, as will be discussed, a detected table is further processed to determine the associated table structure.

Overview for Detecting Handwritten Tables

Figure 3:
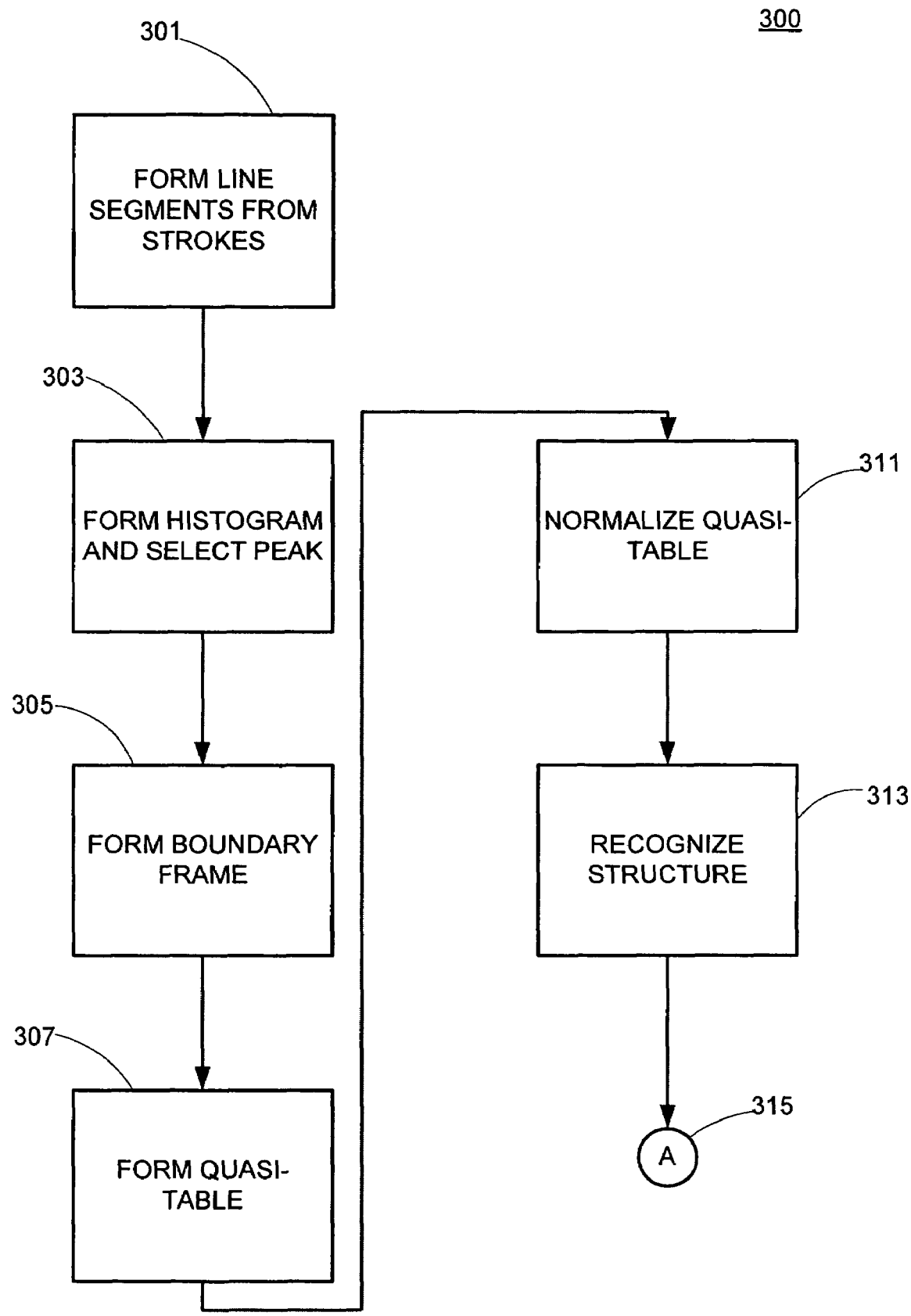
FIG. 3 shows a flow diagram for an algorithm for detecting a table in a handwritten document in accordance with an illustrative aspect of the present invention.
Figure 4:
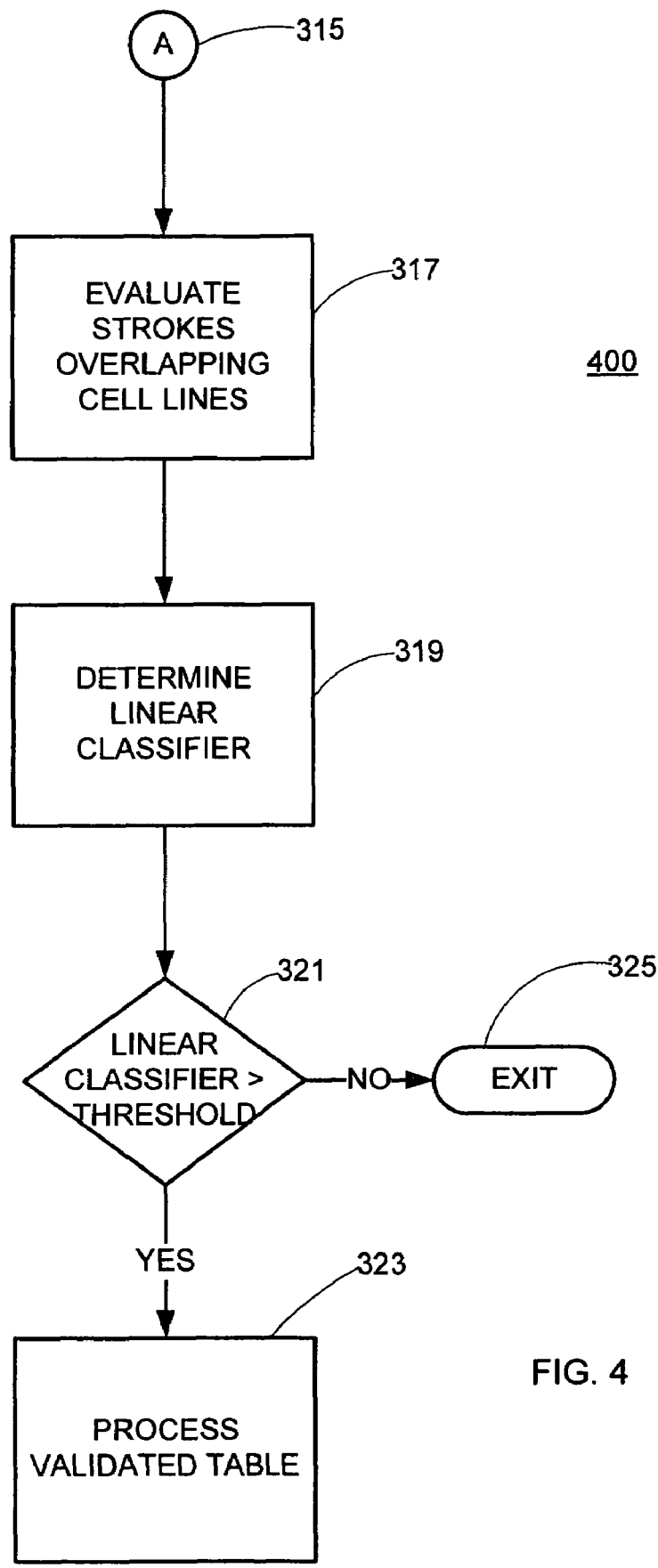
FIG. 4 shows a continuation of the flow diagram as shown in FIG. 3 in accordance with an illustrative aspect of the present invention.

FIG. 3 shows flow diagram 300 for an algorithm for detecting a table in a handwritten document in accordance with an illustrative aspect of the present invention. FIG. 4 shows flow diagram 400, which is the continuation of flow diagram 300 as shown in FIG. 3 in accordance with an illustrative aspect of the present invention. The following discussion provides an overview of an embodiment of the invention and will be discussed in greater detail.

Figure 29:
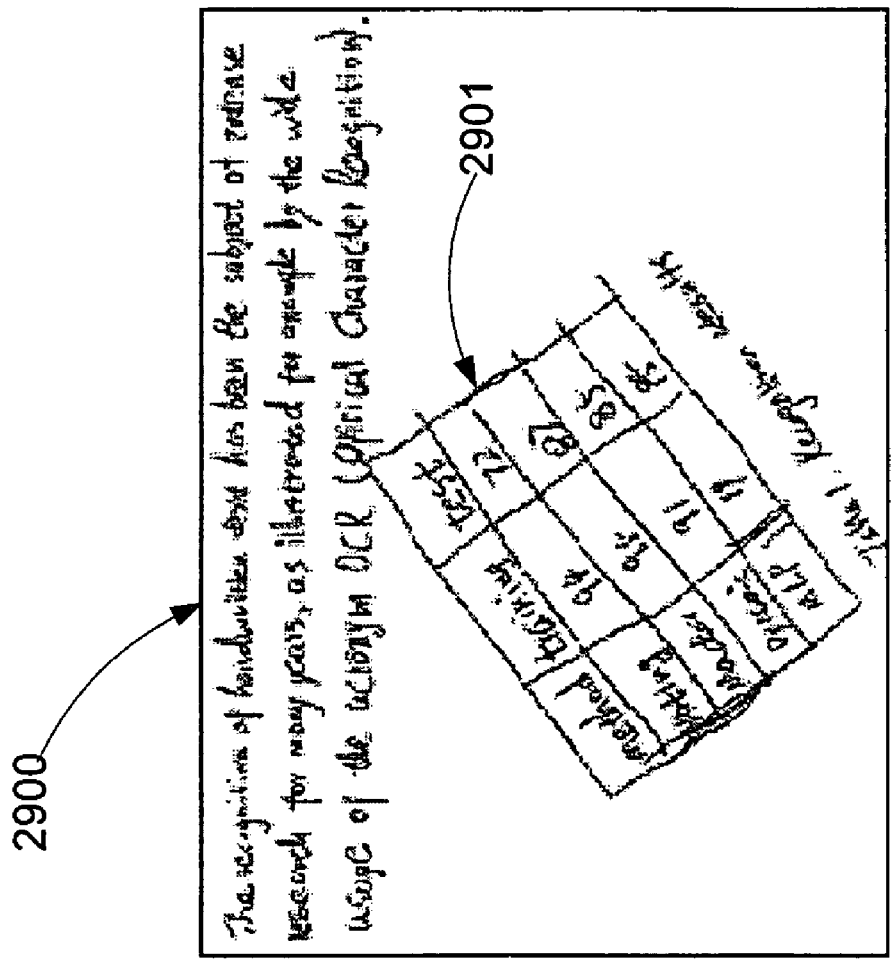
FIG. 29 shows a skewed table in a handwritten document in accordance with an illustrative aspect of the present invention.

Procedure 301 obtains line segments from drawing strokes that are contained in a handwritten document. The directions of the line segments are determined and binned by procedure 303. In order to determine the orientation of the table (which may be skewed as shown in FIG. 29), the histogram peak is selected. With a table, another histogram peak typically occurs approximately 90 degrees from the selected peak.

Procedure 305 determines the bounding frame of the candidate table. Peaks of the histogram are tested one by one from the lowest to highest in order to search for a bounding frame. If the bounding frame is complete, procedure 305 attempts to complete the bounding frame by inserting lines segments.

After forming the bounding frame, procedure 307 forms a quasi-table (candidate table) by collecting all the line segments inside the bounding frame from the line lists, which may be the frame lines. Procedure 311 normalizes the quasi-table to replace nearly horizontal lines segments with essentially horizontal line segments and nearly vertical line segments with essentially vertical line segments. Subsequent procedures determine is the quasi-table is a "real" table (validated table) by determining a probability metric and determining whether the probability metric is above a predetermined threshold.

Figure 19:
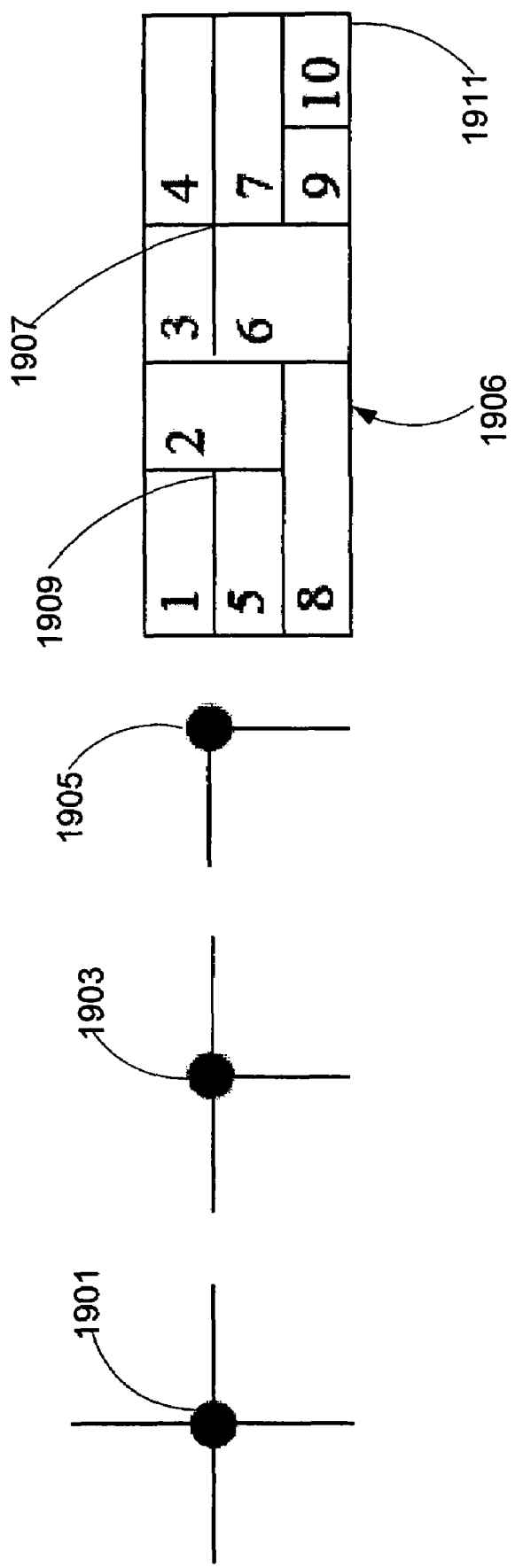
FIG. 19 shows table structure recognition in accordance with an illustrative aspect of the present invention.

Procedure 313 recognizes the associated structure of the quasi-table by analyzing the types of intersection points of the quasi-table. A table may have different types of intersections, including T-junctions, cross intersections, and right-angle junctions as shown in FIG. 19.

Flow diagram 400 continues the logical flow of flow diagram with logical connection 315. Procedure 317 finds the content of each table cell and checks the number of strokes crossing the frame lines to determine a confidence level (metric) associated with the content. If the quasi-table has too many strokes crossing frame lines, the quasi-table may be consequently rejected as a validated table.

Figure 30:
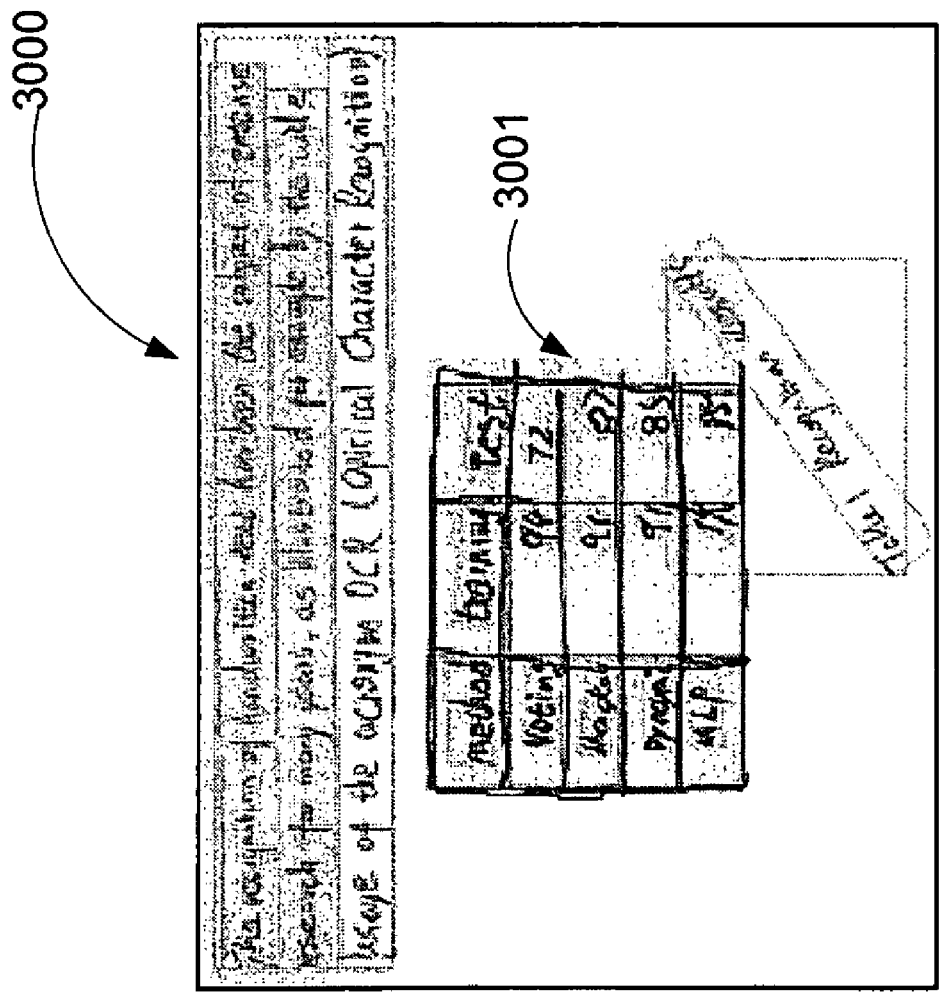
FIG. 30 shows editing the skewed table, as shown in FIG. 29, by horizontally rearranging the table in accordance with an illustrative aspect of the present invention.
Figure 31:
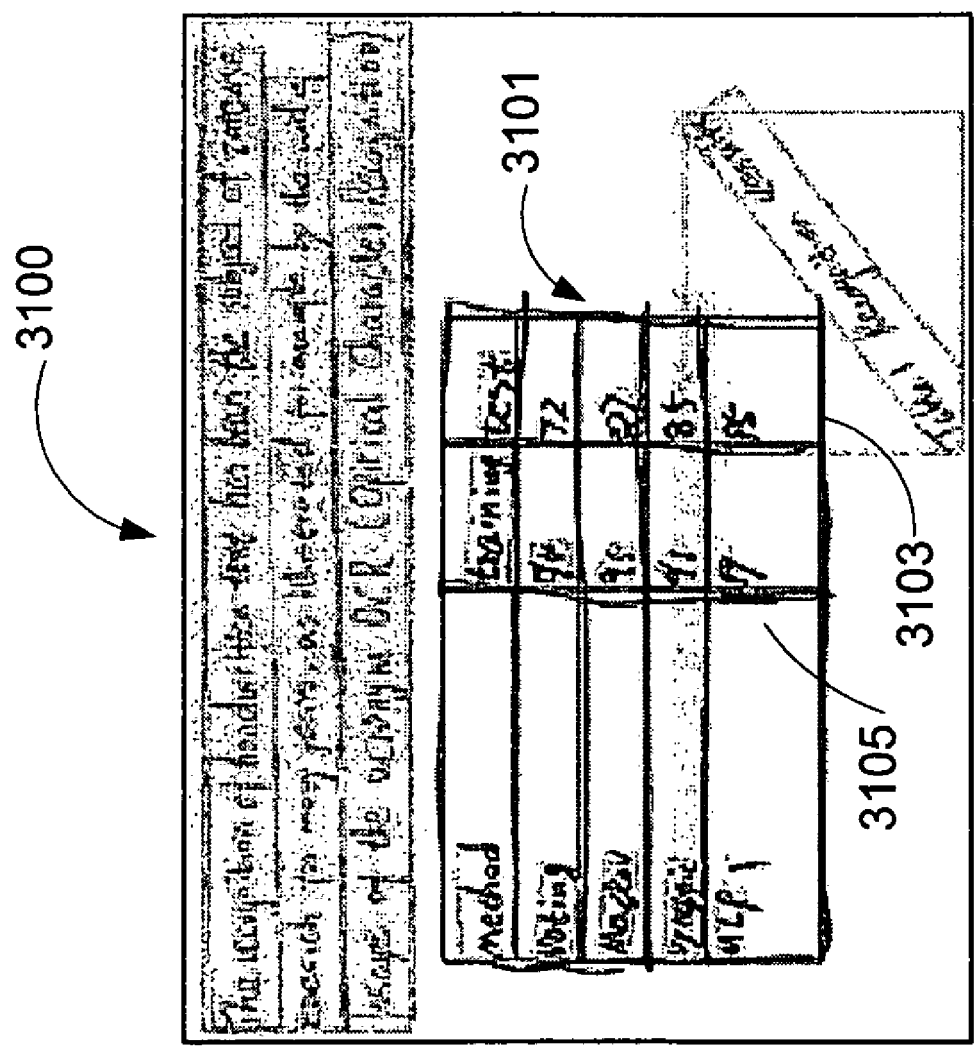
FIG. 31 shows further editing of the skewed table by moving frame lines in the table shown in FIG. 30 in accordance with an illustrative aspect of the present invention.

Procedure 319 determines a linear classifier from confidence levels previously determined in order to obtain an overall confidence level that the candidate table is a valid table. Procedure 321 compares the linear classifier with a predetermined threshold. If the linear classifier is less than or equal to the predetermined threshold, exit procedure 325 is executed. In such a case, a new region of the handwritten document may be analyzed for detected tables. If the linear classifier is greater than the predetermined threshold, the quasi-table (candidate) table is considered as being a validated table, and further processing (e.g., editing as shown in FIGS. 30-31) of the validated table may be executed.

Figure 5:
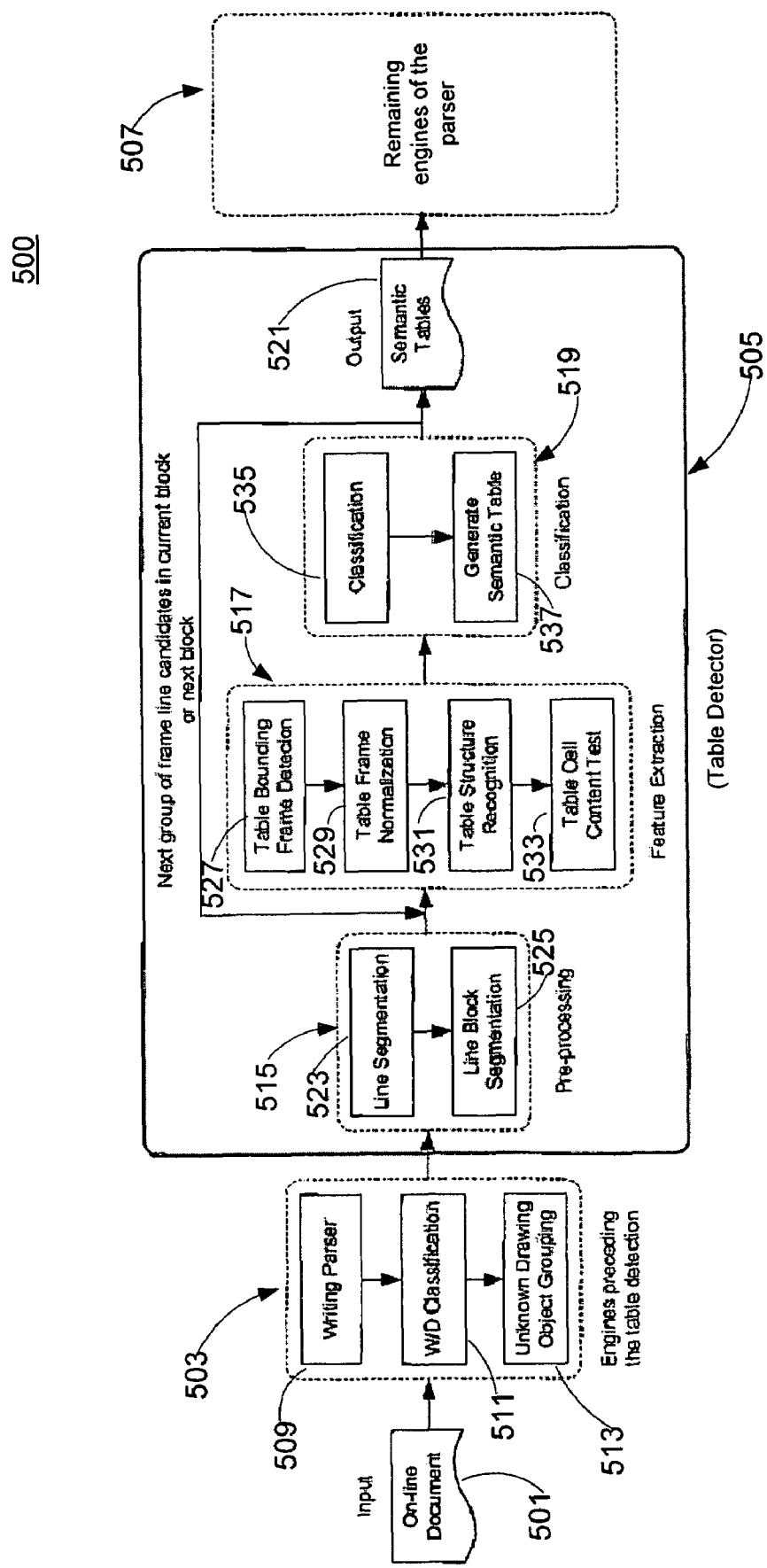
FIG. 5 shows an apparatus that parses a handwritten document in accordance with an illustrative aspect of the present invention.

FIG. 5 shows apparatus 500 that parses a handwritten document (on-line document or ink note) 501 in accordance with an illustrative aspect of the present invention. Apparatus comprises preceding engines 503, table detector 505, and remaining engines 507.

Apparatus 500 supports a pipeline of the advanced parser, where the entire on-line document 501 is processed as input. Engines 509, 511, and 513 of the advanced parser precede the table detection engine 505 and may assist with the table detection. On-line document 501 may contain various semantic entities such as text, graphics, flow charts, and tables. Engines 509-513 are applied to on-line document 501 before table detection. First of all, engine 509 (writing parser) does basic writing/drawing (W/D) separation and groups the writing strokes into three levels: word, line and paragraph. W/D classification engine 511 subsequently determines whether a stroke in ink notes is writing or drawing based on various features. After W/D separation, only drawing strokes are used to detect the table frame lines. Finally, unknown drawing object grouping engine 513 groups nearby writing words and drawing strokes, so that the handwritten objects are spatially separated. Each handwritten object is a potential semantic object that is detected by the engines that follow, e.g., remaining engines 507. Although engines 509-513 are applied before table detection, table detector 505 may not depend on engines 509-513 if processing time is not critical, because table detector 505 can detect line segments and group the line segments into blocks by itself. W/D separation assists to narrow the range of candidate strokes, and unknown object grouping assists with the block segmentation. As will be discussed, table cell content test 533 assists in correcting grouping errors from the writing parser 509. Table detector 505 is able to detect tables in ink notes and extract the structures of the detected table. Moreover, table detector 505 can operate independently of engines 509-513. However, detecting tables based on previous parsing results may speed up the process and have higher accuracy.

Table detector 505 includes preprocessor 515, feature extractor 517, and classifier 519 and provides semantic tables 521 to remaining engines 507. Preprocessor 515 comprises line segmentator 523 that collects all the line segments from an unknown drawing object and line block segmentator 525 that groups the line segments into different regions in terms of the corresponding spatial position.

Feature extractor 517 comprises table bounding frame detector 527, table frame normalizer 529, table structure recognizer 531, and table cell content tester 533. Table bounding frame detector attempts to find the bounding frame of a table. If no complete bounding frame exists, table bounding frame detector proceeds to detect virtual bounding frames. Table frame normalizer 529 normalizes a candidate table (quasi-table) so that nearly horizontal line segments are replaced by essentially horizontal line segments and nearly vertical line segments are replaced by essentially vertical line segments. Table structure recognizer 531 recognizes the structure of the candidate table by analyzing the types of intersection points. Table cell content tester 533 finds the content of each table cell and analyzes the strokes crossing the frames lines of the candidate table. Further discussion of the processes performed by table bounding frame detector 527, table frame normalizer 529, table structure recognizer 531, and table cell content tester 533 will be discussed.

Classifier 519 comprises classification module 535 and semantic table generator 537. Classification module 535 determines an overall confidence level (classifier) from previously determined confidence levels provided by frame extractor 517. If classification module validates the candidate table (e.g., the classifier is greater than a predetermined threshold), generator 537 generates a semantic table from the candidate table.

In an embodiment, table detector 505 can detect two types of tables: with or without complete bounding frames. For both types of tables, the internal frame lines should be explicit. Otherwise, the extracted structure information may be incorrect. When the bounding frame is complete, any table structure that is supported by Microsoft® Word can be detected. For tables with one row or column, additional semantic information may be needed because many illustrations contain similar structures.

When the bounding frame is incomplete, a table is detected when there are at least one horizontal line and one vertical line whose lengths are close to the width and height of the table, respectively. Moreover, the bounding frame should consist of 0 or 2 parallel lines, and at least one of table cell should contain a writing stroke.

The writing/drawing classification is provided by the W/D classification engine 511. If engine 511 is not configured in apparatus 500, table detector 505 tests whether there is a stroke in the table cell. Therefore, the accuracy may decrease slightly. At least one table cell should contain a writing stroke to discern whether the handwritten object is a table or just a particular diagram, e.g., a Go chess manual.

Table detector 505 is designed to be robust in dealing with the following cases:
1. 1. The table can have various types of complex structures, and no a priori knowledge of the table structure is required.
2. The tables need not be horizontal. Multiple tables on a page can be of different orientations.
3. The frame lines can be over-traced, concatenated, or finished in one or multiple strokes.
4. The tables can still be detected after modification, as long as the modified object is still a table.
5. If there are many tables in a page, they can all be detected, even if they are side by side so that the boundaries of tables are ambiguous.

Table detector 505 also extracts the structural information so that table editing (e.g., rotation, scaling, moving the whole table, moving the frame lines, alignment of cell content) is supported. Logically, table detector 505 consists of the following processing stages. At a preprocessing stage (e.g., preprocessor 503), drawing strokes are segmented and approximated by a sequence of line segments, which are grouped into spatially separated blocks. At the detection stage (e.g., table detector 505), the bounding frame is found. When there is no real complete bounding frame, a virtual bounding frame is formed if possible. (For example, referring to table 607 in FIG. 6 virtual line segments 623 and 625 are incorporated with the virtual bounding frame.) The bounding frame, together with all line segments within the bounding frame, forms a quasi-table (candidate table). Second, the quasi-table is normalized. Third, the table structure is recognized and fourth, table cell content is tested. Four table features are extracted in the above four steps respectively. The detection process may terminate whenever a feature exceeds its threshold. Otherwise, a final linear classifier, which combines the four table characteristics (metrics), is applied and finally a semantic table is generated. Otherwise, no table is detected.

FIG. 6 shows examples of detectable and undetectable tables in accordance with an illustrative aspect of the present invention. In accordance with the above discussion, tables 601, 607, 609, and 613 are detected while tables 603, 605, 611, and 615-619 are not detected.

Preprocessing

Figure 7:
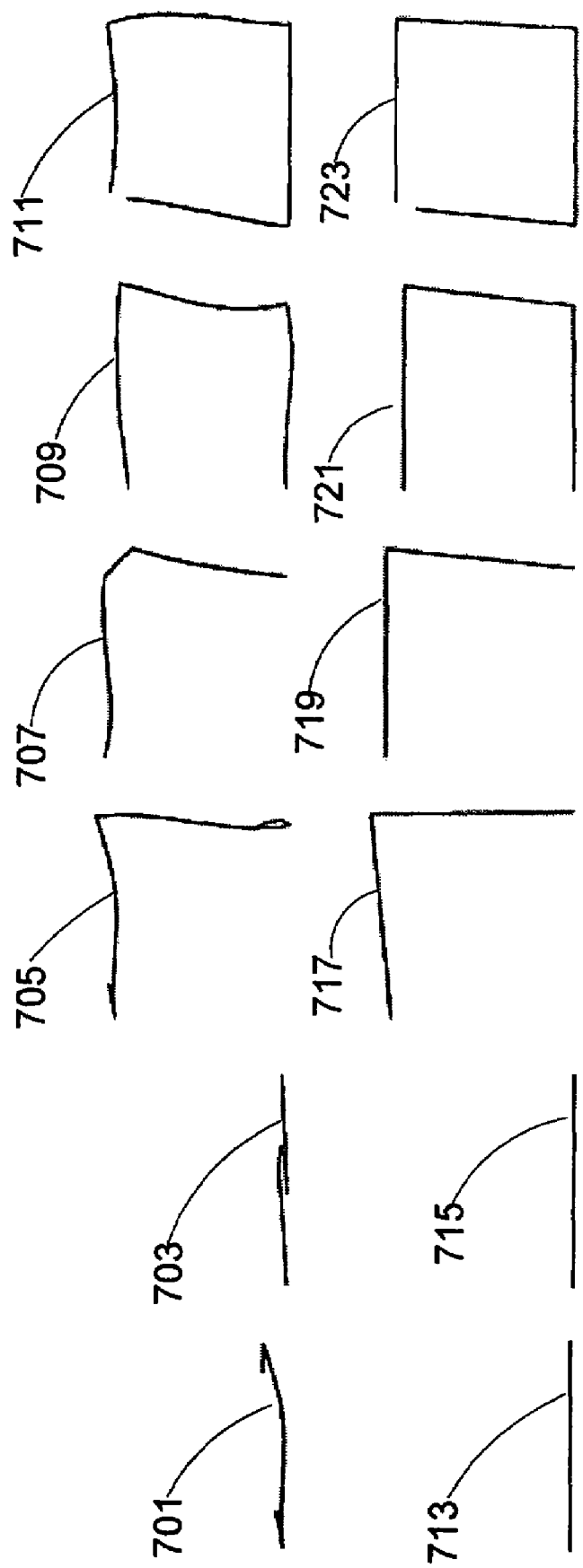
FIG. 7 shows examples of detected line segments in accordance with an illustrative aspect of the present invention.

FIG. 7 shows examples of detected line segments 701-723 in accordance with an illustrative aspect of the present invention. The top row (strokes 701-711) shows input strokes. The bottom row (strokes 713-723) shows line segments after approximation. Input stroke 701 shows a stroke with hooks. Input stroke 703 shows a stroke with self-overtracing. Input stroke 705 shows a stroke that is approximated by two line segments. Input stroke 707 shows a stroke with a round corner. Input stroke 709 shows a stroke that is approximated by three line segments. Input stroke 711 shows a stroke that is approximated by four line segments.

Stroke line segmentation collects all the line segments from an unknown drawing object. Since the user may draw several frame lines (such as a bounding frame) in a single stroke (e.g., input strokes 705-711), one should not examine only those strokes that are close to line segments. Line segmentation and approximation (corresponding to procedure 301 as shown in FIG. 3 and preprocessor 515 as shown in FIG. 5) segments and approximates the strokes and collects all the line segments from the drawing strokes, which are candidates of frame lines. Although a user may draw several frame lines in a stroke, the user usually draws no more than four frame lines (such as the bounding frame) in a single stroke when drawing tables. Therefore, one considers only those drawing strokes that:
1. can be approximated by 1 to 4 line segments, and
2. the turning angles between successive line segments should be close to either 0 degree, 90 degrees, or 180 degrees.

Figure 8:
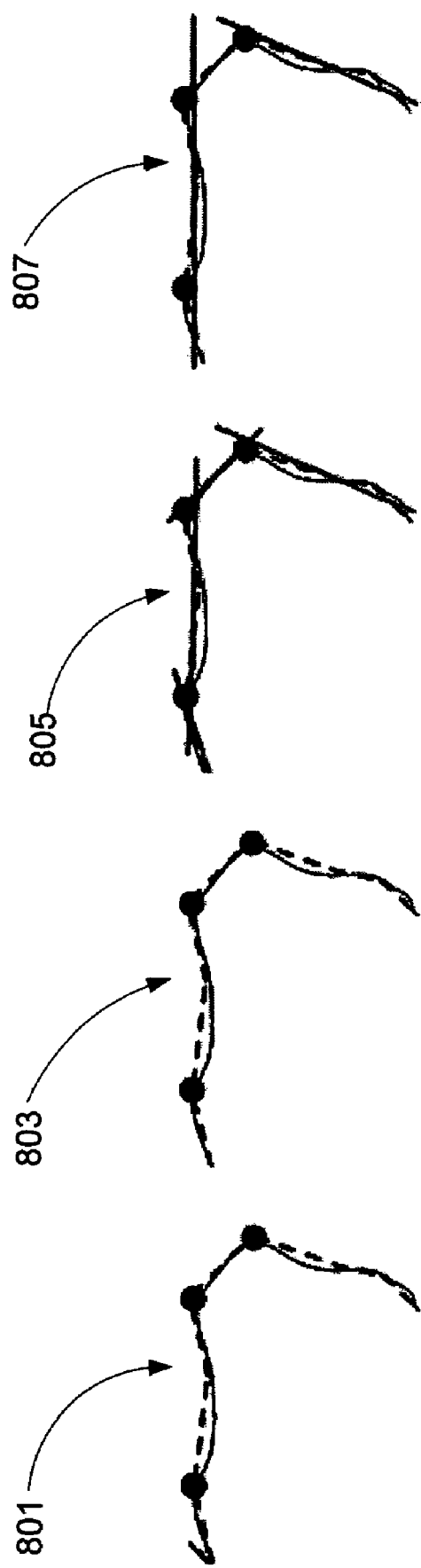
FIG. 8 shows stroke segmentation and approximation in accordance with an illustrative aspect of the present invention.

FIG. 8 shows stroke segmentation and approximation 801-807 in accordance with an illustrative aspect of the present invention. For a drawing stroke, we first test whether it is close to a line segment by computing a linearity characteristic expressed in EQ. 1 (as will be discussed in more detail). If the linearity characteristic does not correspond to a line segment, then the stroke is segmented and approximated. FIG. 8 illustrates the process of stroke segmentation and approximation. First, polygonal approximation algorithm is applied to approximate each drawing stroke with conjoint line segments, up to a prescribed error tolerance (as illustrated by stroke 801). Note that de-hooking should be performed, i.e., the hooks at the ends of a stroke which result from unconscious tremble of hand should be discarded (as illustrated by stroke 803), so that associated noise is removed. Second, three points with the largest curvatures (corresponding to heavy dots in strokes 801-807) are selected, which segment the stroke into four sub-stokes. For the case that the number of line segments is less than four, one picks all the points. Third, one approximates the sub-strokes with line segments by the geometric information of two end points. With an embodiment, one does not use least square error fitting because the fitting may consume substantial computation. Note that the line segment might not pass the curvature extrema (as illustrated by stroke 805).

Figure 9:
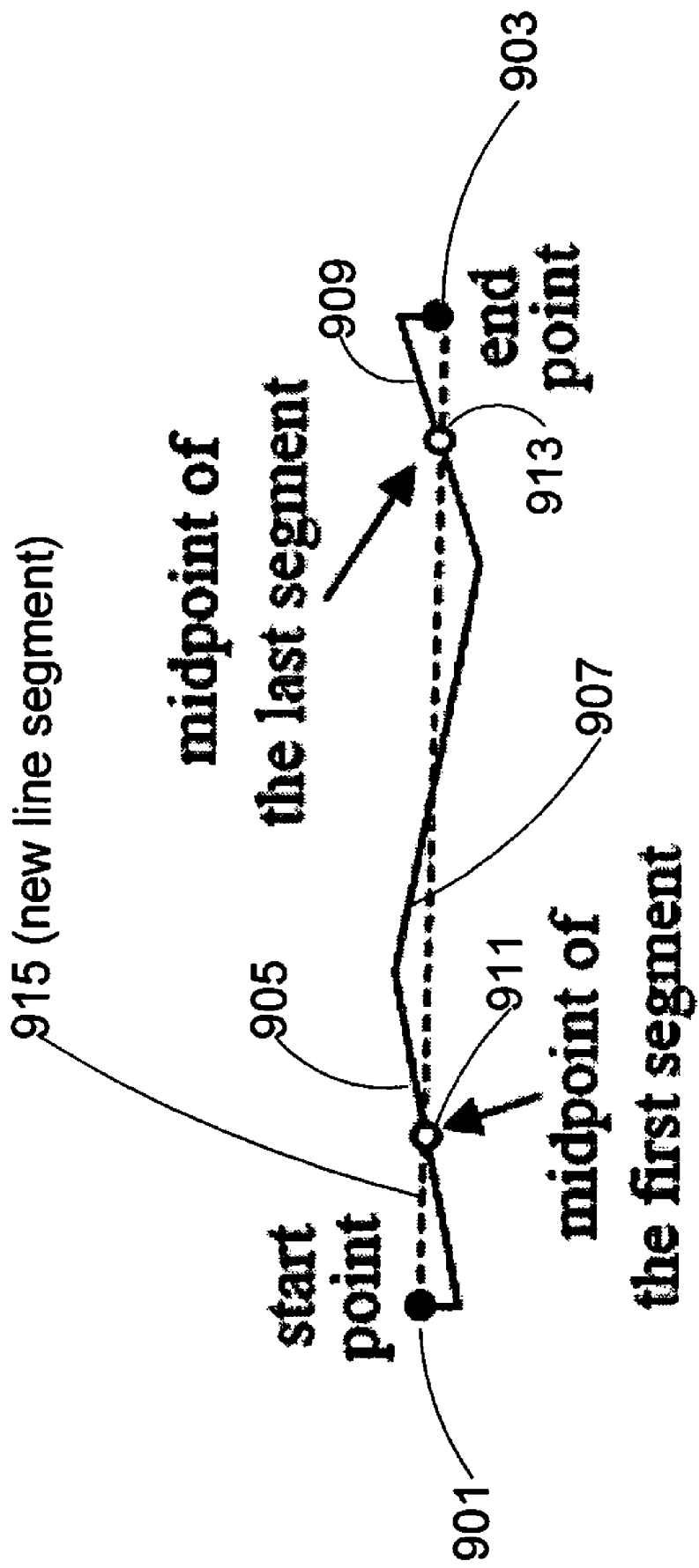
FIG. 9 shows merging of line segments in accordance with an illustrative aspect of the present invention.

Approximation of strokes includes the following steps:
If the conjoint line segments in a sub-stroke are not near parallel, then the stroke cannot be part of a rectangular, and we turn to the next drawing stroke.
Otherwise, the near-parallel line segments (e.g., line segments 905-909 as shown in FIG. 9) in a sub-stroke are merged into a new line segment (e.g., line segment 915). The new line segment is through the two midpoints of the first line segment and the last line segment to be merged (corresponding to midpoints 911 and 913). The start point and the end point of the new line segment are orthogonal projections of the start point and the end point of the approximating line segments (corresponding to points 901 and 903 as shown in FIG. 9) onto the new line segment, respectively.

Fourth, approximating line segments are merged or deleted.
1. If the directions of successive line segments are nearly the same, one merges them into a single segment. The merging process is the same as that of the third step.
2. If the direction of a line segment is reverse to the its predecessor and successor, it may be the self-overtracing part of the stroke. So one deletes it and the approximating line segment is recomputed.
3. If the line segments are too short and its predecessor and successor is close to be orthogonal, then they are deleted, and the approximating line segment is recomputed (as illustrated by stroke 807).
4. If the number of remaining line segments is larger than one, then one checks whether each remaining line segment is close to being orthogonal with both its predecessor and successor. If there are four line segments, the orthogonality between the first and last segments should also be tested. If not, then the stroke must not be part of a rectangle.
5. If there is only one line segment left or the remaining line segments pass the test in previous step, then one adds the remaining line segments to the line list, which stores all possible candidates of frame lines.

Line Block Segmentation

After line segmentation and approximation, a selected stroke is represented by its approximating line segments. There may be multiple tables in one page. To detect all of them, one groups the line segments obtained in the previous step into different regions in terms of their spatial position. The line segments within a region are regarded as a line block. For each line block, all line segments within it are stored in a line list. Then a histogram is built to count the number of line segments around each direction. Each peak in the histogram may be associated with another peak that is approximately 90 degrees away from it for a table, which may not be horizontal. The table detector checks each peak and associated peaks to find whether there are tables. If a whole block is checked, the table detector turns to the next block.

Detecting a Bounding Frame

Detecting Real Complete Bounding Frame

Figure 10:
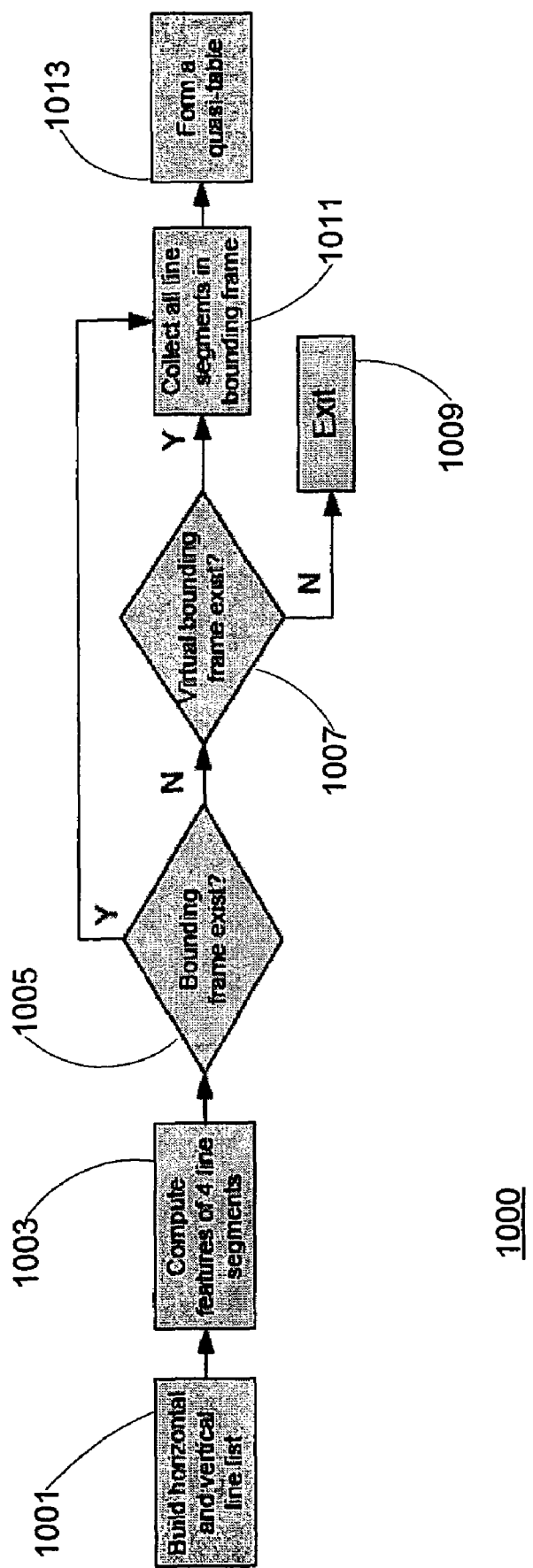
FIG. 10 shows a flow diagram for detecting a table bounding frame in accordance with an illustrative aspect of the present invention.

FIG. 10 shows flow diagram 1000 for detecting a table bounding frame in accordance with an illustrative aspect of the present invention. The process shown in FIG. 10 attempts to find the bounding frame of a table. If no complete bounding frame exists, the system proceeds to detect virtual bounding frames as performed by procedure 1007.

First of all, from the histogram of the number of line segments associated with each direction range, one selects line segments whose directions are close or perpendicular to the direction that corresponds to a peak. The peaks of the histogram are tested one by one from the highest to the lowest. Rotation is applied so that the line segments are near a horizontal or vertical direction. Then one builds the horizontal line list and the vertical line list as performed by procedure 1001.

Procedure 1003 determines a confidence level ($P_{BF}$) that four line segments forms a bounding frame. The determination of $P_{BF}$ will be discussed in more detail. Procedure 1005 then determines if the confidence level is greater than a predetermined threshold. If so, then procedure 1011 collects all line segments in the bounding frame and forms a quasi-table in procedure 1013. If the confidence level is less than or equal to the predetermined threshold, then procedure 1007 attempts to construct a virtual bounding frame. If not possible, then the process is exited in procedure 1009.

Figure 11:
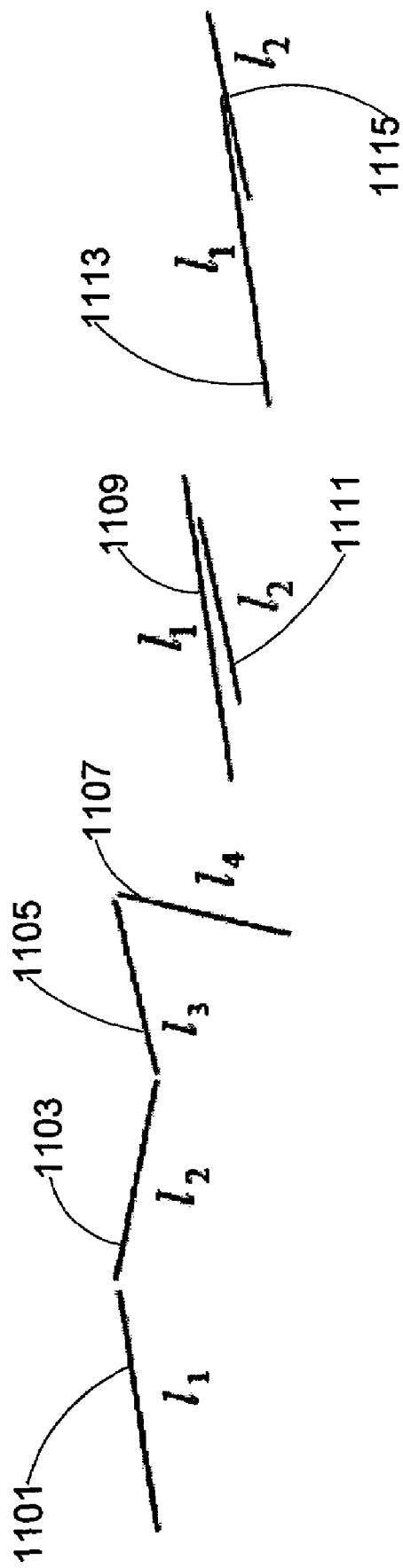
FIG. 11 shows examples of composite frame line segments in accordance with an illustrative aspect of the present invention.

As one needs to deal with over-traced and concatenated frame lines, the line list also stores all composite line segments that are the combination of some concatenatable and near-parallel original line segments. FIG. 11 shows examples of composite frame line segments 1101-1115 in accordance with an illustrative aspect of the present invention.

All possible combinations of two horizontal line segments and two vertical line segments (original or composite) are tested to compute the likelihood $P_{BF}$ of forming a bounding frame from four metrics (linearity, similarity, rectangularity, and saliency) as discussed below.

Linearity $f_l$ of the Line Segment

Figure 12:
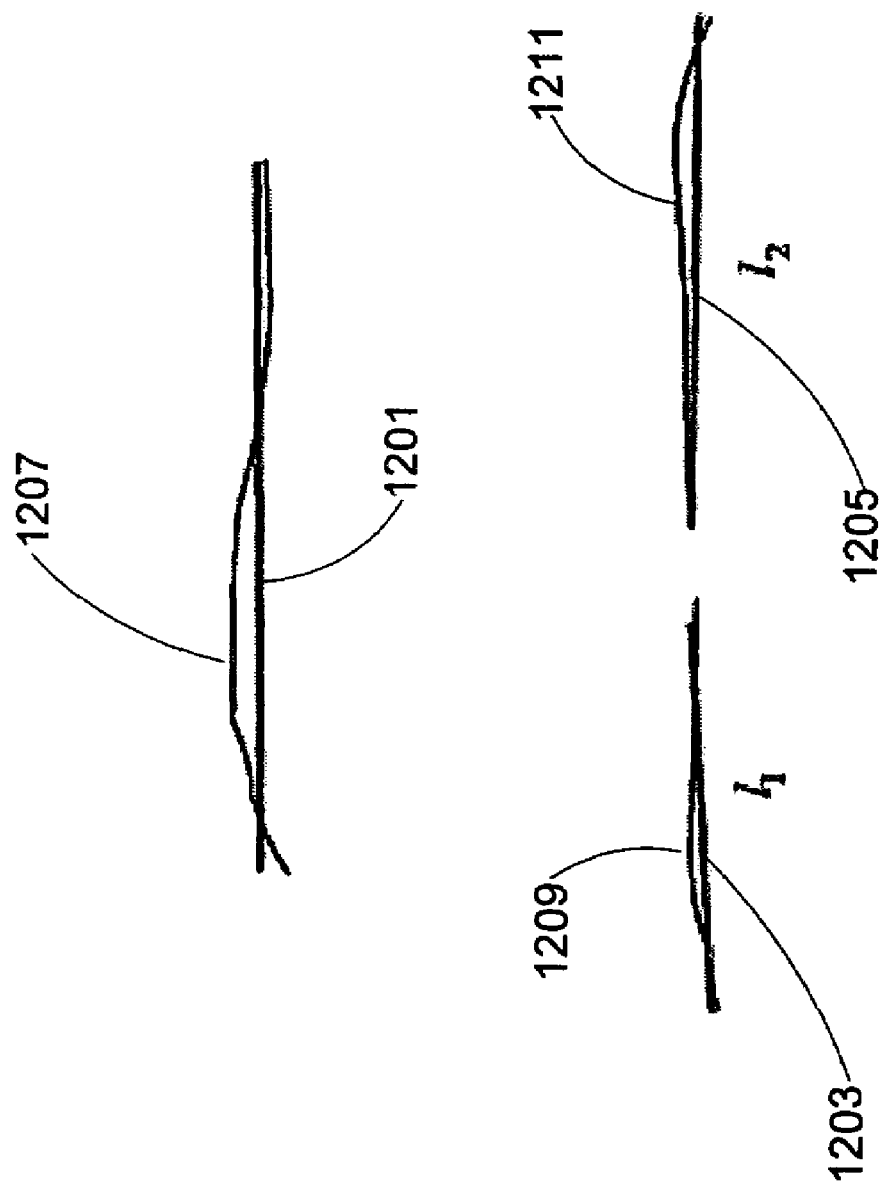
FIG. 12 shows a linearity of a line segment in accordance with an illustrative aspect of the present invention.

FIG. 12 shows a linearity metric of a line segment in accordance with an illustrative aspect of the present invention. The linearity metric $f_l$ describes how well a line segment (an original line segment or a composite line segment) approximates the stroke or strokes that are represented by it. If the line segment is original (line segment 1201), then the line segment corresponds to the linearity of stroke 1207 it approximates:

$$f_l = \frac{B_w}{B_h + B_w} \cdot \frac{B_w}{L} \qquad \text{(EQ. 1)}$$

where $B_w$ and $B_h$ are the width and height of the skew bounding rectangle of the stroke, whose principal direction is computed via least square, and L is the length of the stroke. Note that $B_w/(B_h+B_w)$ measures the flatness of a stroke and $B_w/L$ measures the fluctuation of the stroke.

Figure 13:
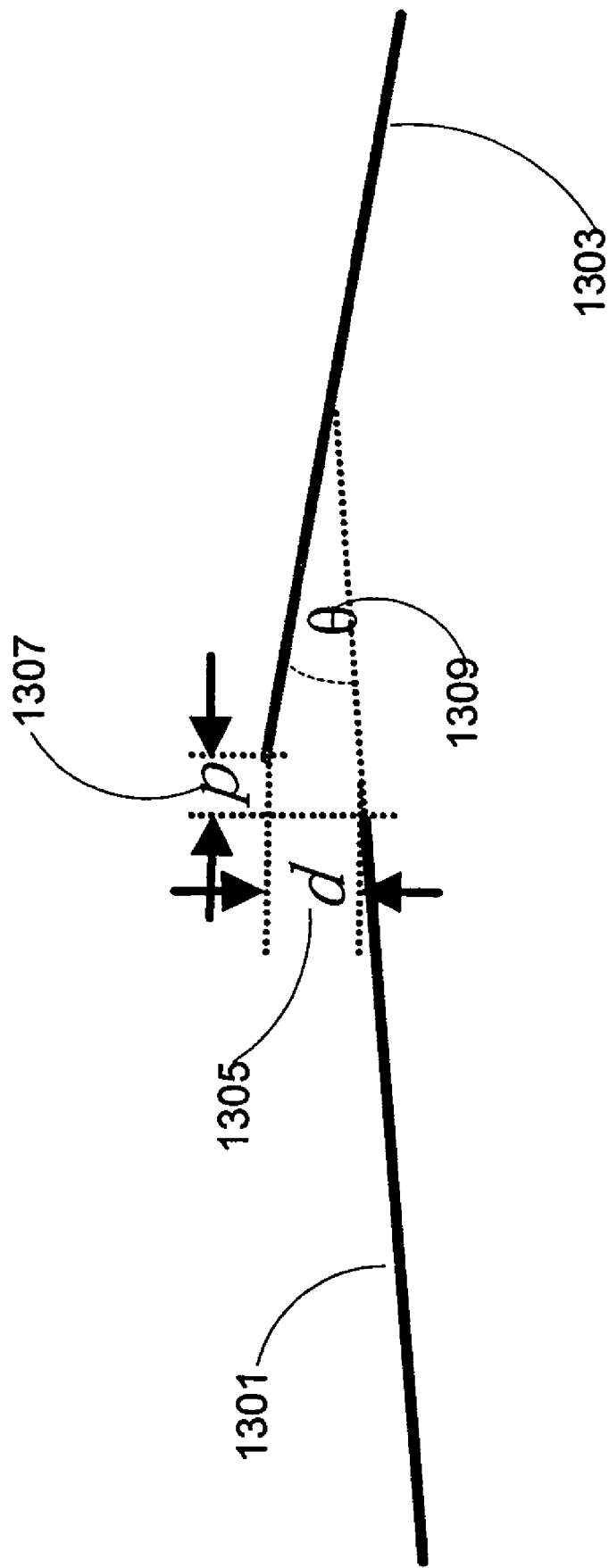
FIG. 13 shows factors for determining a concatenation strength of two line segments in accordance with an illustrative aspect of the present invention.

If the line segment is composite (corresponding to line segments 1203 and 1205), then metric $f_l$ is the product of the linearity of the component strokes 1209 and 1211 and the concatenation strength $f_{con}$ between successive line segments:

$$f_l = \left(\prod_i f_{li}\right) \cdot \left(\prod_i f_{con}(i, i+1)\right) \qquad \text{(EQ. 2)}$$

where $f_{con}=1-\theta\cdot(A\cdot p+B)-C\cdot p\cdot(1+|d|)^2$, in which (assuming that the line segments are near horizontal): $\theta$ is the acute angle (corresponding to $\theta$ 1309 as shown in FIG. 13) between the two line segments (corresponding to line segments 1301 and 1303), p (corresponding to p 1307) is the horizontal distance between the conjunction points, and d (d 1305) is 0 if the two line segments intersect each other, or otherwise, the vertical distance between the ends of the two line segments. FIG. 13 shows factors for determining a concatenation strength of two line segments in accordance with an illustrative aspect of the present invention.

A, B and C are some positive parameters determined empirically. Note that p is negative if the two line segments overlap in horizontal direction. Concatenation strength $f_{con}$ is monotone in d, p and $\theta$ so that the concatenation strength fits our intuition. The value is '1' if the two lines are concatenated perfectly.

Similarity $f_p$ of the line segment pair

Figure 14:
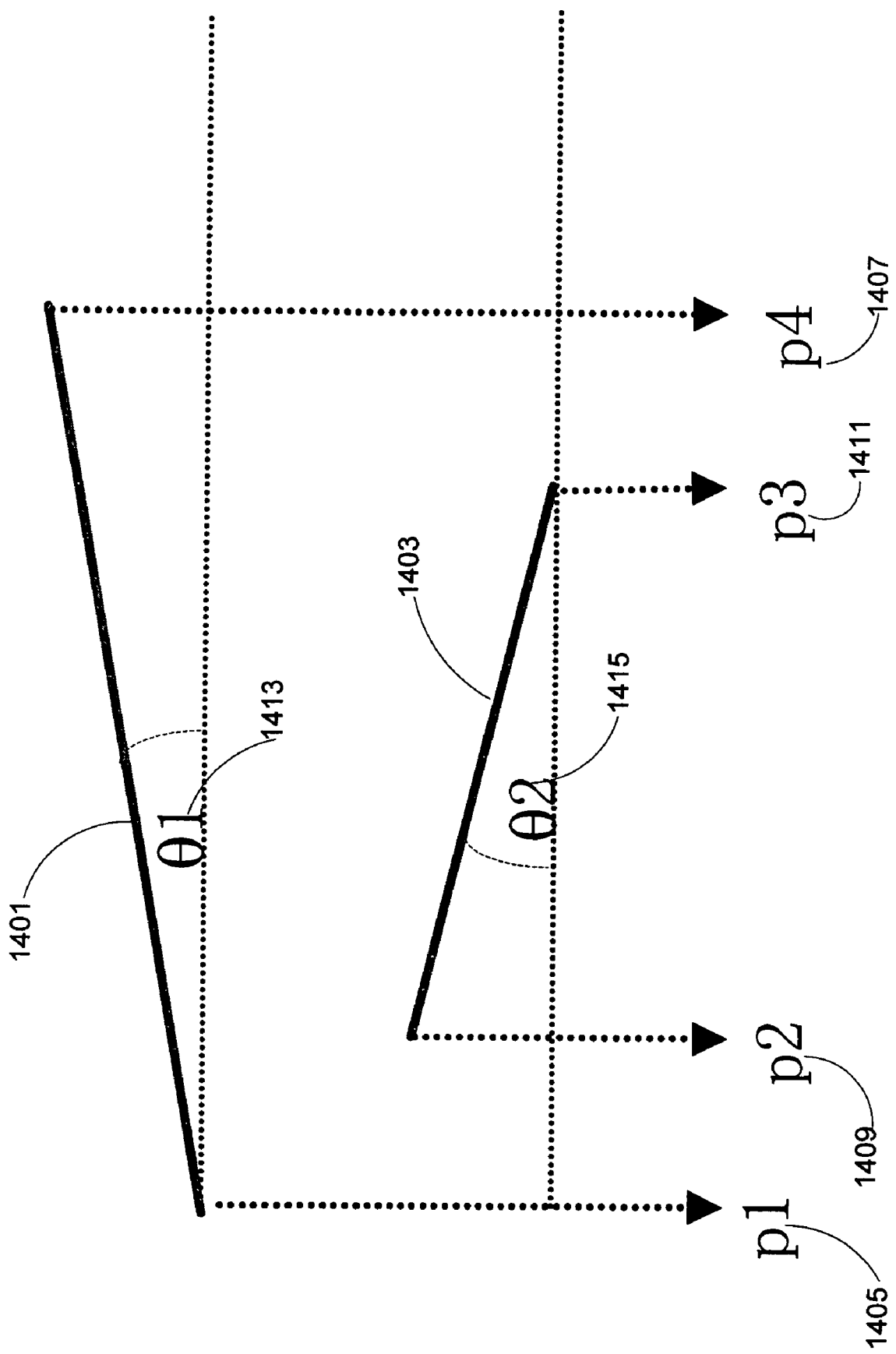
FIG. 14 shows factors for determining a similarity of a pair of line segments in accordance with an illustrative aspect of the present invention.

FIG. 14 shows factors for determining a similarity of a pair of line segments 1401 and 1403 in accordance with an illustrative aspect of the present invention. Similarity metric $f_p$ shows whether two line segments can be a pair of line segments corresponding to the bottom line and top line (or the left and right line) of a real table. Similarity metric $f_p$ is defined as:

$$f_p = \left(1 - \frac{|\theta_1 - \theta_2|}{\pi/2}\right) \cdot \left(1 - \frac{|l_1 - l_2|}{l_1 + l_2}\right) \cdot \left(1 - \frac{|p_1 - p_2| + |p_3 - p_4|}{\max(l_1, l_2)}\right) \qquad \text{(EQ. 3)}$$

where (assuming that the line segments are nearly horizontal, as shown in FIG. 14): $\theta_i \in (-\pi/4, \pi/4)$ is the acute angle of the $i^{th}$ line segment, $l_i$ is the length of the $i^{th}$ line segment, and $p_j$ are the four sequent projection points of the end points of the line segments, from left to right. (The parameters contained in EQ. 3 correspond to parameters 1405-1415 as shown in FIG. 14.) Line segments of a pair of line segments for a rectangular object have common characteristics, i.e., the line segments have approximately equal lengths and directions and must align their centers. Similarity metric $f_p$ reflects the common characteristics.

Rectangularity $f_r$ of the Possible Bounding Frame

Figure 15:
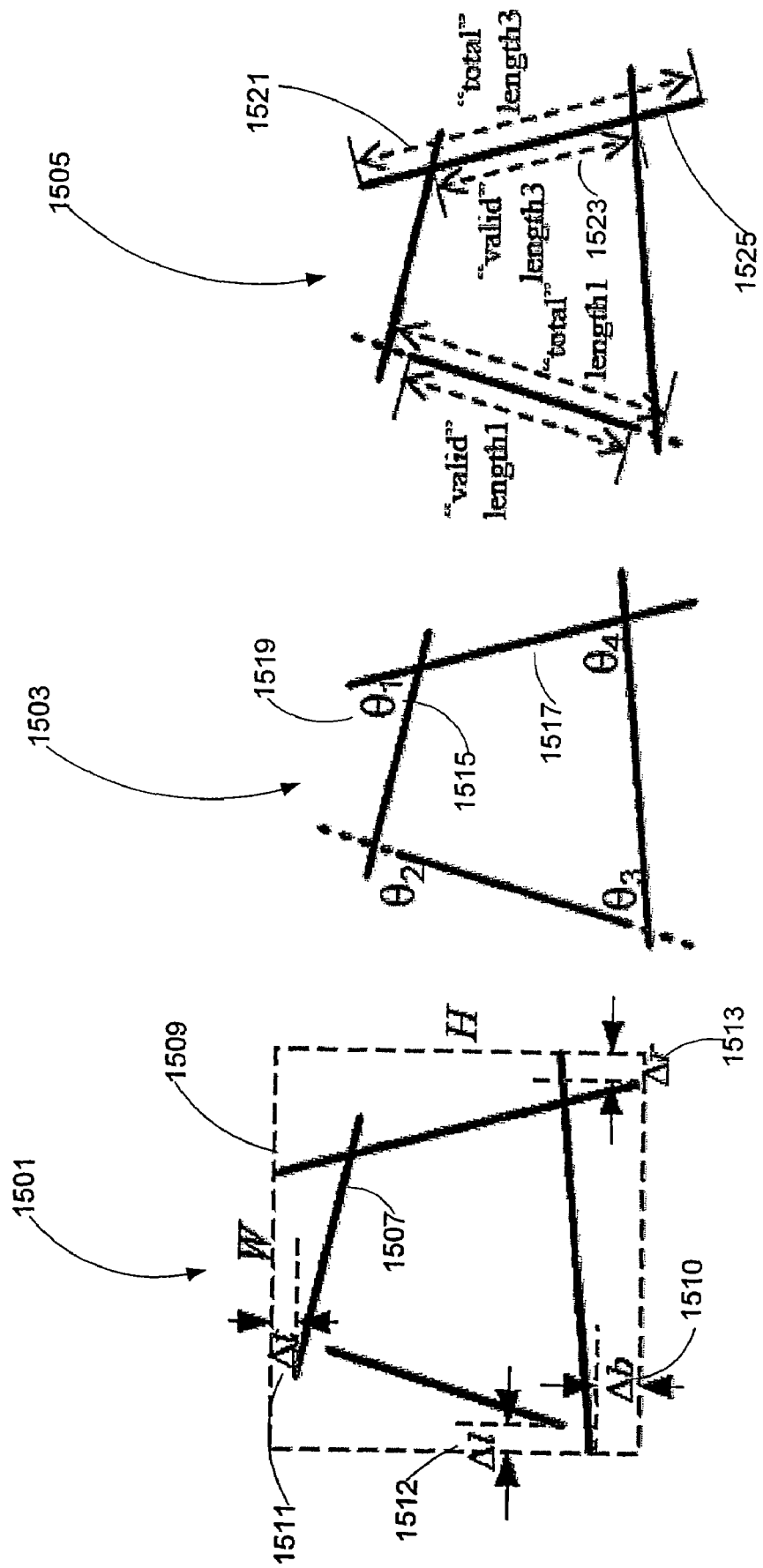
FIG. 15 shows factors for determining a rectangularity of a candidate bounding frame in accordance with an illustrative aspect of the present invention.

FIG. 15 shows factors for determining a rectangularity metric of a candidate bounding frame in accordance with an illustrative aspect of the present invention. Rectangularity metric $f_r$ describes the likelihood that four lines are the four borderlines of real rectangle 1509 in rectangular region 1501. It consists of three component metrics:

$f_{min}$: the relative minimum distance between the line segments and the bounding box in four directions (left, right, top, bottom) (as illustrated in rectangular region 1501):

$$f_{min} = \left(1 - \frac{\Delta t + \Delta b}{H}\right) \cdot \left(1 - \frac{\Delta l + \Delta r}{W}\right) \qquad \text{(EQ. 4)}$$

where $\Delta b$ 1510 is the smaller distance between the end points of bottom line segment and the bottom of the bounding box, and $\Delta t$ 1511, $\Delta l$ 1512 and $\Delta r$ 1513 are similarly defined as shown in FIG. 15.

$f_{angle}$: the average of the four acute angles between successive line segments (as illustrated by rectangular region 1503, e.g., $\theta_1$ is the angle between line segments 1517 and 1519):

$$f_{angle} = \frac{\theta_1 + \theta_2 + \theta_3 + \theta_4}{2\pi} \qquad \text{(EQ. 5)}$$

$f_{vl}$: the ratio of total "valid" length to "total" length. The "valid" length is the smaller one of the length of line segment and the length of the part between successive line segments, while the "total" length is the whole length of the line segment plus possible gap between its ends and its successive line segment (as illustrated by rectangular region 1505, e.g., length 1521 is the total length of line segment 1525 and length 1523 is the valid length of line segment 1525):

$$f_{vl} = \frac{\text{"valid" length 1} + \ldots + \text{"valid" length 4}}{\text{"total" length 1} + \ldots + \text{"total" length 4}} \qquad \text{(EQ. 6)}$$

The rectangularity metric $f_r$ is a linear combination of $f_{min}$, $f_{angle}$ and $f_{vl}$. It shows how well four lines fit the four borderlines of a rectangle from the aspects of shape, angle and length.

Saliency $f_s$ of the Possible Bounding Frame

Figure 16:
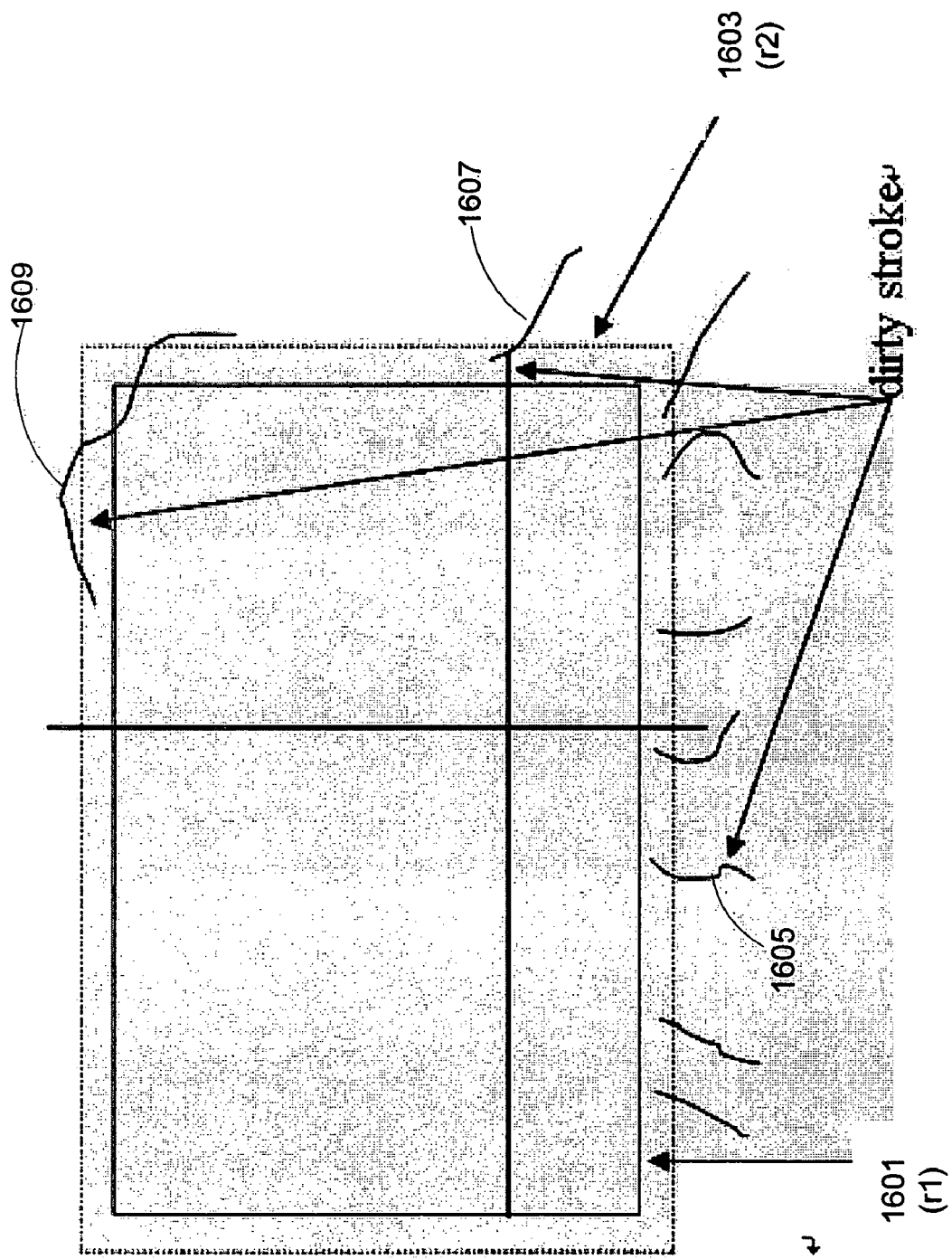
FIG. 16 shows a determination of saliency of a candidate bounding frame in accordance with an illustrative aspect of the present invention.

FIG. 16 shows a determination of saliency of a candidate bounding frame in accordance with an illustrative aspect of the present invention. Saliency metric $f_s$ shows how isolated a table is from other outside strokes. Saliency metric $f_s$ utilizes contextual information. If there are many strokes around the possible bounding frame, the area surrounded by the bounding frame may not be a table, and saliency metric $f_s$ should decrease. The area between the sensitive box $B_2$ 1603 and the bounding box $B_1$ 1601 of the possible bounding frame, where $B_2$ and $B_1$ are concentric and the ratio of their sizes, which is referred as the sensitive rate, is greater than 1. The sensitive rate is a system parameter. The saliency $f_s$ is defined as:

$$f_s = 1 - \frac{\text{the number of dirty strokes}}{\text{the number of all strokes in } B_2} \qquad \text{(EQ. 7)}$$

where dirty strokes (e.g., strokes 1605-1609) are those strokes that are outside $B_1$ 1610 and touch the sensitive area.

As described above, four metrics $f_l$, $f_p$, $f_r$ and $f_s$, describe different characteristics of the bounding frame. The four line segments are rejected if any of the four metrics is below its corresponding threshold, otherwise the confidence $P_{BF}$ of four line segments forming a bounding frame is a linear combination of the above four metrics. If the maximum $P_{BF}$ is above a threshold, one extracts the corresponding four line segments to decide whether the line segments form a bounding frame.

Detecting Virtual Bounding Frame

Figure 17:
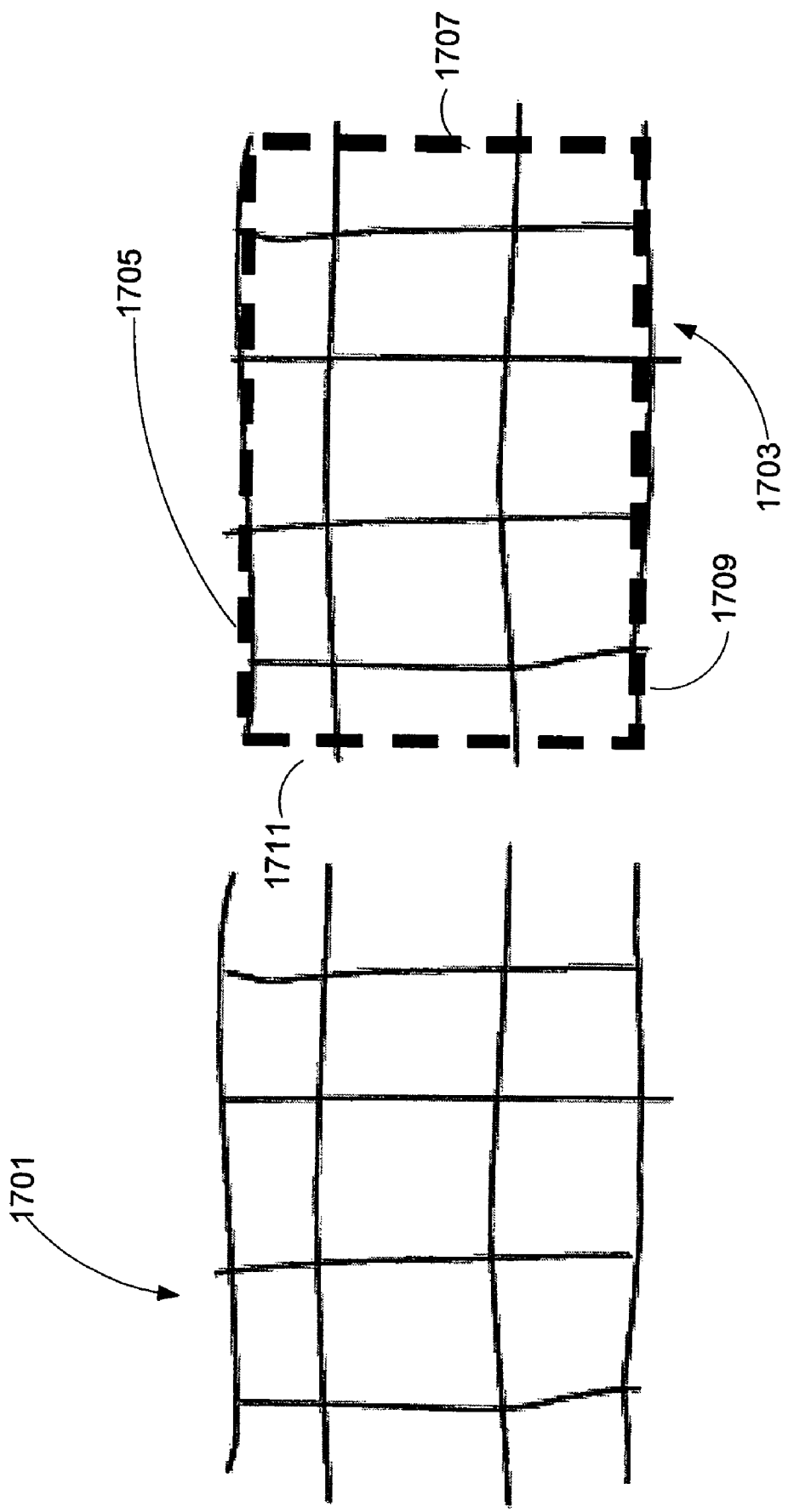
FIG. 17 shows forming of a virtual bounding frame in accordance with an illustrative aspect of the present invention.

FIG. 17 shows forming of a virtual bounding frame in accordance with an illustrative aspect of the present invention. If no real complete bounding frame is found, apparatus 500 proceeds to detect whether there are tables without complete bounding frames. Table detector 505 starts from determining a set of equi-length orthogonal line segments as illustrated by line segment set 1701. Both the horizontal and vertical line lists are sorted from long to short. Subsequently, table detector 505 alternatively searches the horizontal line list and the vertical line list, so that the next chosen line segment intersects all the line segments chosen from the other list and both its length and vertical (or horizontal) shift are close to those of previous line segments chosen from the same list. If a set of crossing line segments 1703 is found, the virtual bounding frame (having component lines that are either horizontal or vertical) is obtained by the linear regression of the end points of the corresponding line segments (corresponding to line segments 1705-1711). Finally, table detector 505 decides whether a line segment belongs to the bounding frame. (Note that the table detector 505 of an embodiment is designed to detect tables with 0 or 2 parallel border lines). The virtual bounding frame is adjusted if border lines are found, e.g., bottom line 1709. After determining the virtual bounding frame, table detector 505 continues as with a real complete bounding frame.

Quasi-Table Formation

Forming a Quasi-Table

After the bounding frame, real or virtual, is detected, a quasi-table is then formed by collecting all the line segments inside the bounding frame from the line lists, which may be the frame lines. One refers to this set of line segments as a "quasi-table" because the set of line segments is a candidate for a real table and one cannot decide whether it is really a table at this point of processing.

Table Frame Normalization

FIG. 18 shows normalization of a table frame in accordance with an illustrative aspect of the present invention. In order to obtain the structure of quasi-table 1800 and simplify the subsequent computation, the process normalizes quasi-table 1800 so that the nearly horizontal or vertical line segments are replaced by essentially exactly horizontal or vertical line segments. (For example, line segment 1853 replaces line segment 1851 for normalized quasi-table 1850.) Also, the process determines whether a vertical line segment intersects a horizontal line segment. The following discussion provides the steps of normalization and the computation of normalization metric $P_{norm}$, which measures the quality of intersection. Suppose a quasi-table has m horizontal lines and n vertical lines, one computes all the m*n crossing points and records the information whether the two lines really cross or could cross each other by prolonging them. It can be acquired by computing such equations:

$$P=(1-p)P_{i1}+pP_{i2} \quad \text{(EQ. 8a)}$$

$$Q=(1-q)Q_{j1}+qQ_{j2} \quad \text{(EQ. 8b)}$$

where P is the horizontal line, $P_{i1}=[x_{i1}, y_{i1}]^T$ and $P_{i2}=[x_{i2}, y_{i2}]^T$ are the start point and the end point of the line P respectively, and p is a parameter of scalar quantity. The parameters in EQ. 8b are defined similarly.

Solving the above equations for P=Q, one can have the values of p and q, from which one can obtain the crossing information of the two lines. For each (i, j), one can obtain values $p_{ij}$ and $q_{ij}$, and hence two matrices: $P_{m\times n}$ and $Q_{m\times n}$, which describe the intersection information of the quasi-table. The following steps will normalize the lines and intersection points.

$$x(j)=(1-q(j))Q_{j1}.x+q(j)Q_{j2}.x \quad \text{(EQ. 9a)}$$

$$y(j)=(1-p(i))P_{i1}.y+p(i)P_{i2}.y \quad \text{(EQ. 9b)}$$

where $p(i)=(p_{i1}+p_{i2}+\ldots+p_{in})/n$ ($1\leq i\leq m$) and $q(j)=(q_{1j}+q_{2j}+\ldots+q_{mj})/m$ ($1\leq j\leq n$). Then the $i^{th}$ horizontal line after normalization can be represented by two new points $P_s(i)$ and $P_e(i)$ as the start point and end point, respectively.

$$P_s(i).x=x(1) \; P_s(i).y=y(i) \quad \text{(EQ. 10a)}$$

$$P_e(i).x=x(n) \; P_e(i).y=y(i) \quad \text{(EQ. 10b)}$$

The $j^{th}$ vertical line can be similarly expressed. With all the horizontal and vertical lines normalized, the normalized intersection points can be computed. Finally, one adjusts the geometry information for the table with m horizontal and n vertical intersection points. The intersection information, i.e., where two lines really intersect, is recorded at the same time. Subsequently, one can compute normalization metric $P_{norm}$, which is formed by the linear combination of two sub-metrics: intersection component metric $f_{int}$ and valid frame line component metric $f_{vfl}$.

Intersection component metric $f_{int}$ measures the quality of intersection. It is defined as the ratio of the number of "bad" intersection points to that of all intersection points. A "bad" intersection point (e.g., intersection 1803) is one that is decided to be an intersection point, but the corresponding two line segments do not really intersect each other.

$$f_{int} = 1 - \frac{\text{the number of "bad" intersection points}}{\text{the number of all intersection points}} \quad \text{(EQ. 11)}$$

Valid frame line component metric $f_{vfl}$ measures the cleanness of the table frame. The engine will reject a table candidate if there are many strokes crossing the frame lines. It is defined as the ratio of the number of invalid line segments to that of all line segments:

$$f_{vfl} = 1 - \frac{\text{the number of invalid line segments}}{\text{the number of all line segments}} \quad \text{(EQ. 12)}$$

where an "invalid" line segment has only one intersection point (e.g. line segment 1801). The invalid line segments and those that do not intersect with any other line segments are abandoned so that they do not affect the table structure. The above two component metrics are linearly combined to form the normalization metric (confidence level) $P_{norm}$ for normalizing a quasi-table.

Table Structure Recognition

FIG. 19 shows table structure recognition in accordance with an illustrative aspect of the present invention. After normalization, the intersection information, or the intersecting relationship of all line segments, is obtained. Table detector 505 recognizes the structure of table by examining the type of intersection points. There are three types of intersection points: cross intersection 1901 (corresponding to intersection point 1907 in table 1906), T-junction intersection 1903 (corresponding to intersection point 1909), and right-angle intersection 1905 (corresponding to intersection point 1911). If an intersection point is not one of the four corners of the bounding frame, then the intersection point can only be a cross or a T-junction. FIG. 20 shows abandoning line segments that are related to an erroneous intersection points 2009 and 2021 in accordance with an illustrative aspect of the present invention. If an intersection point of right-angle type does exist and is not one of the four corner points, table detector attempts to remove this intersection point by checking the line segments related to the intersection point in the following manner:

If the intersecting line segment is original, table detector 505 abandons the line segment, e.g., line segments 2005 and 2007 are abandoned for erroneous intersection point 2009 for quasi-table 2001.

Otherwise, the line segment is composed of several line segments. Table detector 505 abandons the component line segments 2011-2015 in the order of their distance from erroneous intersection point 2021 until the remaining line segments form a valid table structure for quasi-table 2003.

After abandoning some line segments, the structure of quasi-table is obtained. Then the table cells are ordered according to the coordinates of their top-left corner, left to right and then top to down. Table 1906 is an example of ordering of the cells. This step produces the structural confidence level $P_{str}$:

$$P_{str} = 1 - \frac{N_{error\_intersect}}{N_{total\_intersect}} \quad \text{(EQ. 13)}$$

where $N_{error\_intersect}$ is the number of erroneous intersection points which is of right-angle type and is not one of the four corner points of the table bounding frame, and $N_{total\_intersect}$ is the number of all intersection points.

Analysis of Cell Content

Figure 21:
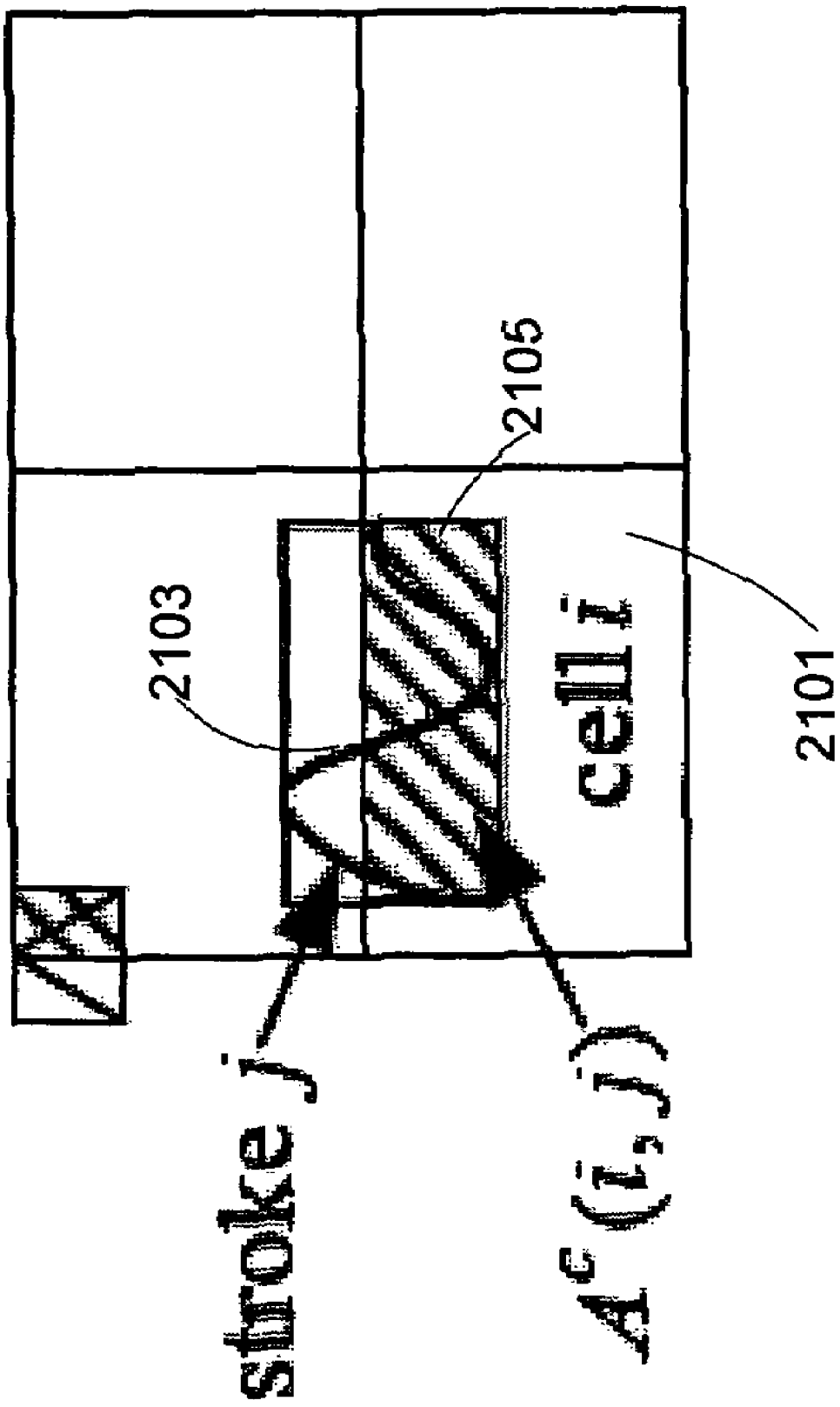
FIG. 21 shows a common area of an $i^{th}$ cell and a $j^{th}$ stroke in accordance with an illustrative aspect of the present invention.

FIG. 21 shows a common area of an $i^{th}$ cell 2101 and a $j^{th}$ stroke 2103 in accordance with an illustrative aspect of the present invention. Before this process, table detector 505 has not determined whether a quasi-table is a real table. As previously discussed, table detector 505 rejects a table candidate if there are too many strokes crossing the frame lines. The process finds the content of each cell in order to complete the table information, and also checks the number of strokes crossing the frame lines to evaluate the confidence of being a real table. The cell content test checks the bounding box of each cell and those of all objects (such as paragraph, line, word, and stroke, after rotating them) in the unknown drawing object that contains the current quasi-table, by the proportion of their common area in the bounding box of an object. It is done from top level to lower level. Namely, if a paragraph is judged to be in a cell, the test stops. Otherwise, one continues to test the line, etc. The process may continue until the stroke level. For drawing strokes, the testing is also top-down if the unknown drawing object grouping engine also groups the drawing strokes in a hierarchy. This process can correct the grouping errors from previous engines. For example, an over-grouped paragraph, line or word can be split into smaller parts that are in different cells or outside the table. This step produces the confidence level $P_{con}$ of content output. It is defined as:

$$P_{con} = \sum_{i=1}^{N_{cell}} \sum_{j=1}^{N_{stroke}} \mu_{ij} \cdot \left(1 - \frac{A_{ij}^c}{\min(A_i, B_j)}\right) \quad \text{(EQ. 14)}$$

where $A_{i,j}^c$ 2105 is the common area of the $i^{th}$ cell 2101 and the bounding box of the $j^{th}$ stroke 2103, $A_i$ is the area of the $i^{th}$ cell, $B_j$ is the area of the bounding box of the $j^{th}$ stroke), $\mu_{ij}$ is a parameter reflecting the position relationship of the $j^{th}$ stroke to the frame lines of the $i^{th}$ cell, and $N_{cell}$ and $N_{stroke}$ are the numbers of cells and strokes which intersect the frame lines of cells, respectively. One introduces $\mu_{ij}$ due to the consideration that if a stroke is on a frame line, the confidence level should decrease more when it is near the ends of the frame line than when it is near the center, because the stroke is often an arrow head. If a quasi-table has a virtual bounding frame and there are no writing strokes in any cell, the quasi-table is rejected immediately.

In fact, table detector 505 computes features dynamically in order to deal with some complex cases, such as several tables are too close to separate them from each other, or a table is modified for many times. For example, if table detector 505 cannot decide whether the handwritten input corresponds to two tables close to each other or just one large table, table detector 505 should regard both of the cases as correct. Table detector 505 computes all metrics in the two cases respectively and subsequently compares the final confidence level to find the better one. When computing the metrics, a penalty and inspiring mechanism is applied, i.e., if a line segment can be treated as a bottom line of a table in one case and a top line of a table in the other case, the metric value should be penalized.

Determination of a Classifier

Figure 22:
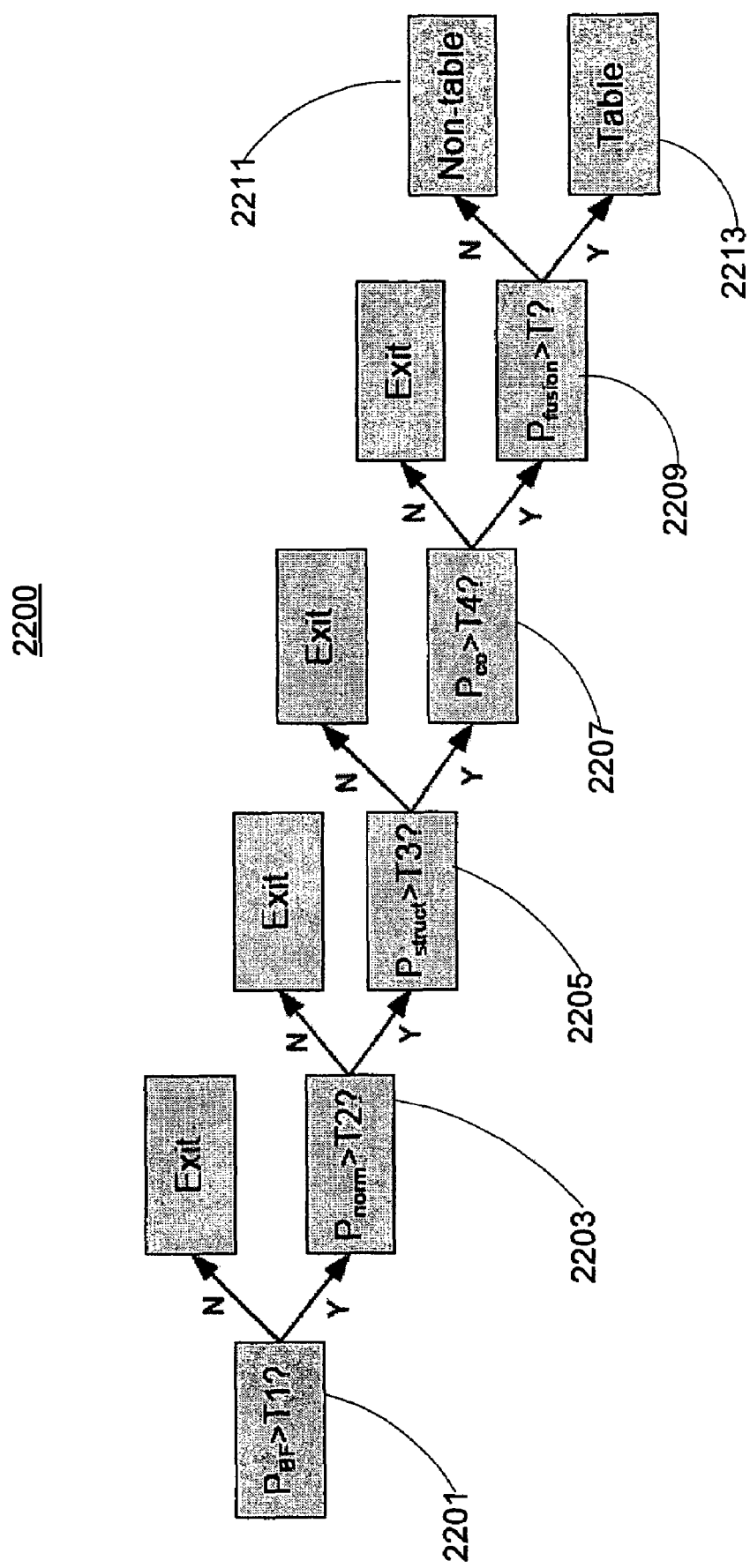
FIG. 22 illustrates a decision tree whether a written input corresponds to a validated table in accordance with an illustrative aspect of the present invention.

FIG. 22 illustrates decision tree 2200 whether a written input corresponds to a validated table in accordance with an illustrative aspect of the present invention. As previously discussed four metrics $P_{BF}$, $P_{norm}$, $P_{str}$, and $P_{con}$, each of which reflects a characteristic of tables, are determined. An embodiment may use one of various classification schemes to draw a conclusion. For example, table detector 505 uses a linear classifier which combines linearly the four metrics (e.g., associated confidence levels). One may specify an overall confidence as a linear combination of the four metrics:

$$P_{fusion} = W_1 P_{BF} + W_2 P_{norm} + W_3 P_{str} + W_4 P_{con} \quad \text{(EQ. 15)}$$

where the weight $W_i$ ($1 \leq i \leq 4$) are all positive values. With table detector 505, the parameters and thresholds are determined step by step. The parameters and thresholds are first chosen empirically. The parameters and thresholds are tuned manually in order to approximately minimize the error of table detection results. For example, 20 test pages and human may be processed and the corresponding results examined. The process may be repeated for several times. The parameters and thresholds in use may not be optimal, but as will be explained later, automatic tuning may be difficult. Table detector 505 does not always execute all the metric comparisons (corresponding to steps 2201-2209). If a corresponding confidence level is too low for a corresponding step, table detector 505 may terminate immediately and turn to the next candidate table. If the overall confidence $P_{fusion}$ is above a threshold (corresponding to step 2209), the table detector decides that the candidate table is a real table (corresponding to step 2213) and outputs the semantic table. Otherwise, no table is detected (corresponding to step 2211), and table detector 505 checks the next candidate table.

In additional to a linear classifier, embodiments of the invention may utilize other types of classifiers. For example, a non-linear classifier may include terms in which metrics are raised to a power other than one. Moreover, classifiers may be provided by support vector machines or neural networks.

Structure of a Parse Tree

Figure 23:
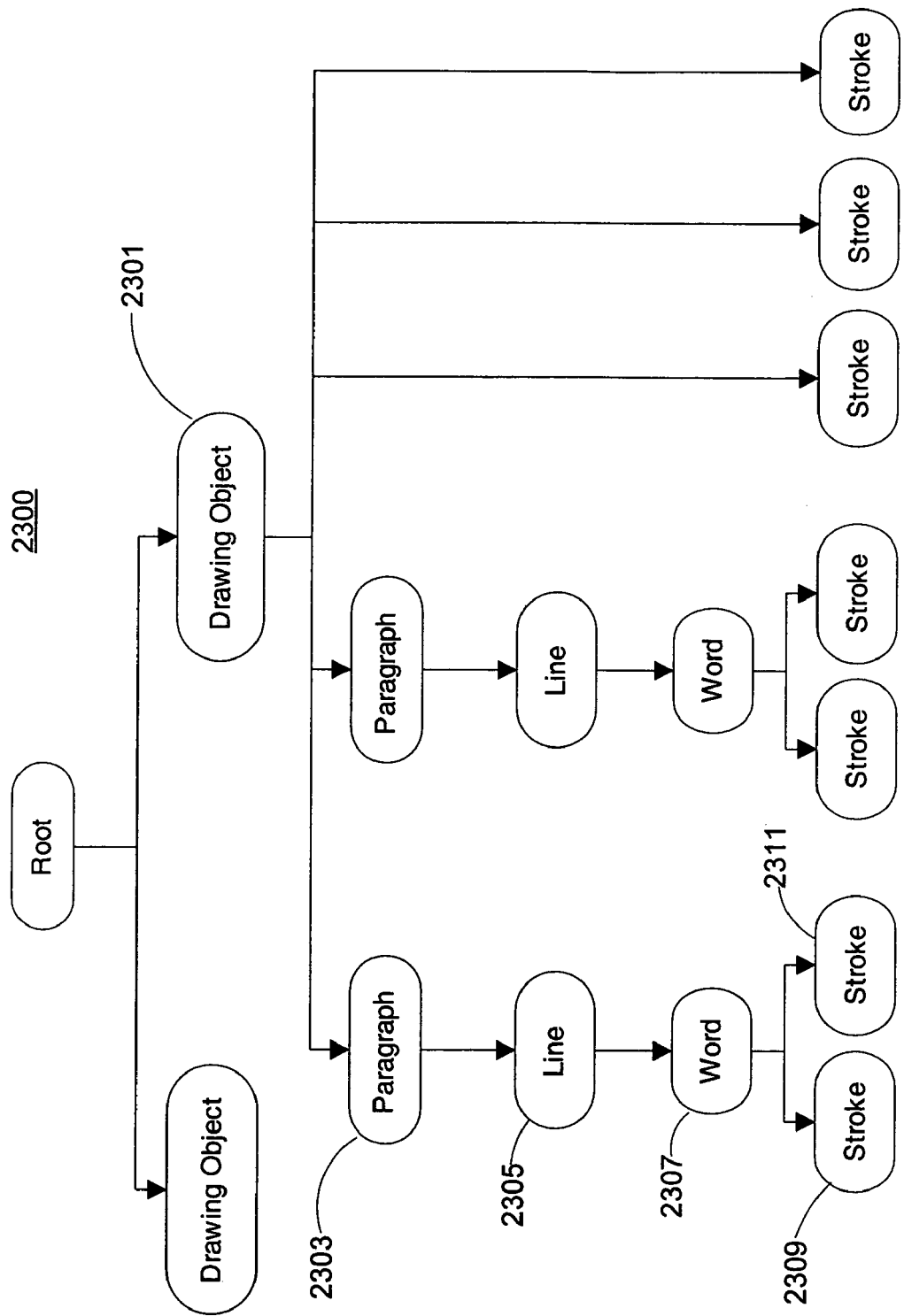
FIG. 23 shows a structure of a parse tree without table detection in accordance with an illustrative aspect of the present invention.

FIG. 23 shows a structure of parse tree 2300 without table detection in accordance with an illustrative aspect of the present invention. A drawing object 2301, which comprises handwritten text, is successively parsed into paragraphs (paragraph object 2303), lines (line object 2305), words (word object 2307), and strokes (stroke objects 2309-2311).

Figure 24:
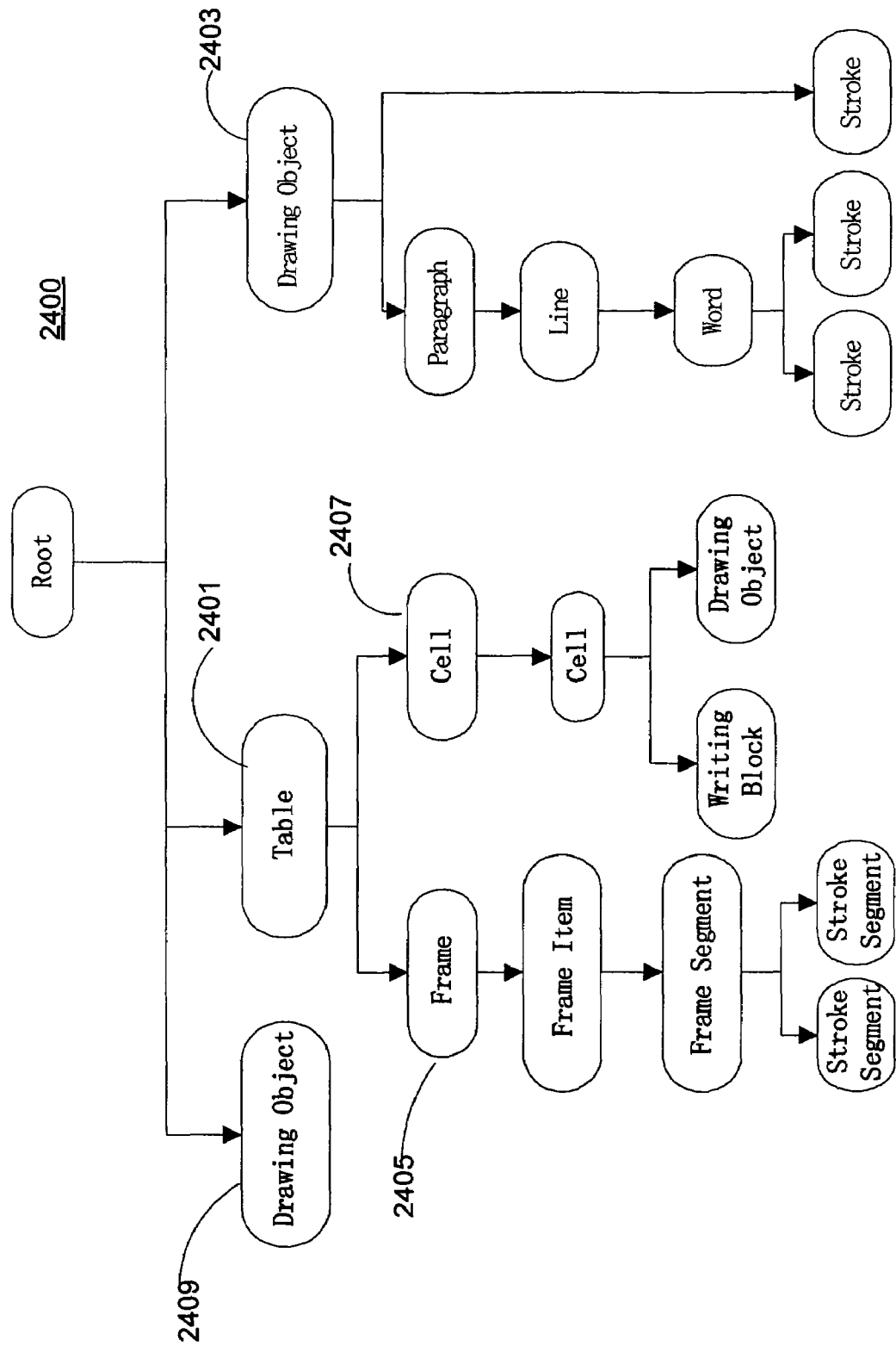
FIG. 24 shows a structure of a parse tree with table detection in accordance with an illustrative aspect of the present invention.

FIG. 24 shows a structure of parse tree 2400 with table detection in accordance with an illustrative aspect of the present invention. A handwritten document may comprise different types of structured objects, including handwritten text and tables. As with parse tree 2300, parse table 2400 successively parses text (drawing object 2403) into paragraphs, lines, words, and strokes. Also, parse table 2400 can parse tables (corresponding to table 2401). Correspondingly, parse tree 2400 parses a table (object 2401) into a frame (frame object 2405) and cells (cell object 2407). Moreover, parse tree 2400 may support other types of structured objects (e.g., drawing object type 2409) as will be discussed later.

Experimental Results

Figure 25:
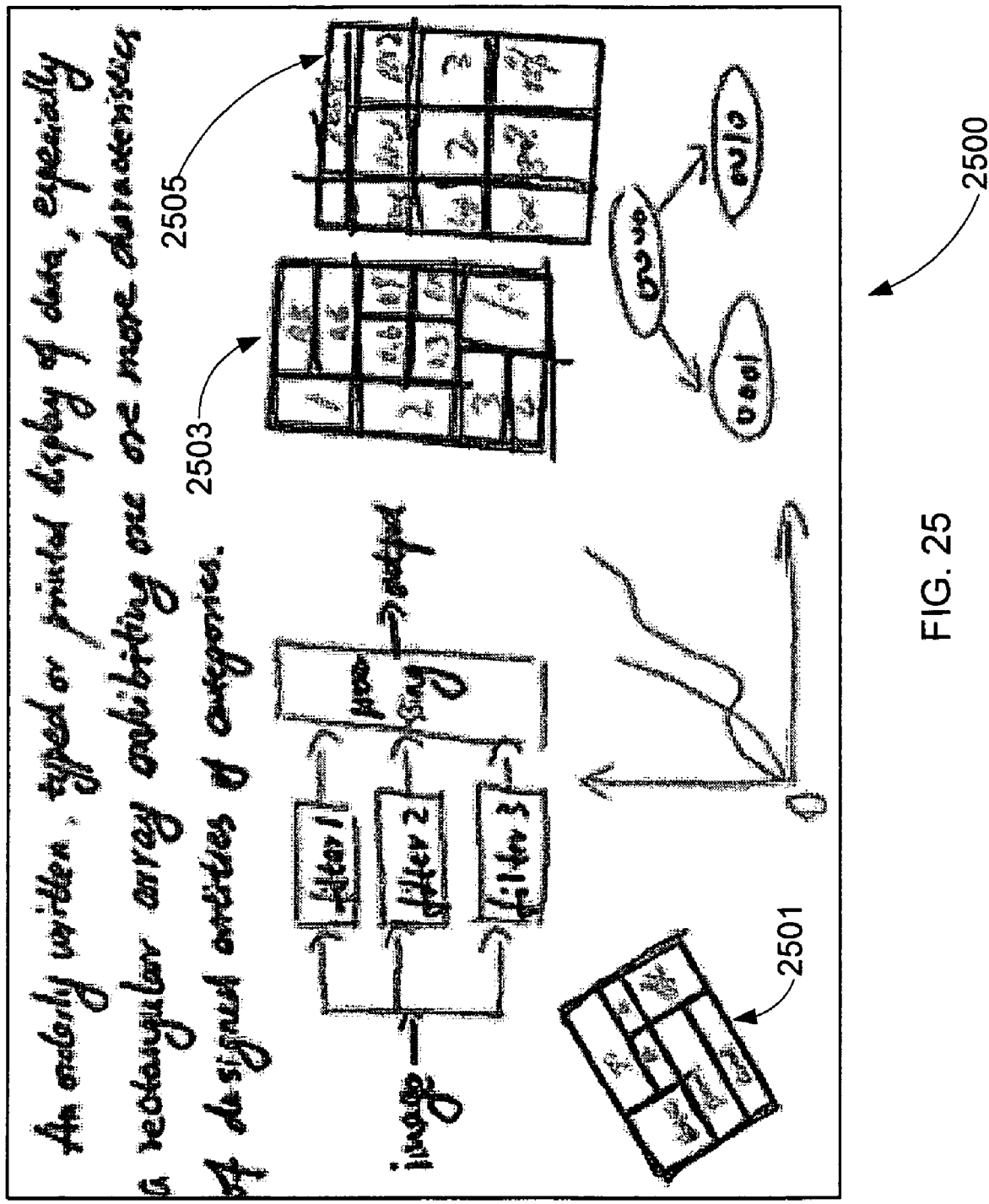
FIG. 25 shows a detection result of a handwritten document in accordance with an illustrative aspect of the present invention.
Figure 27:
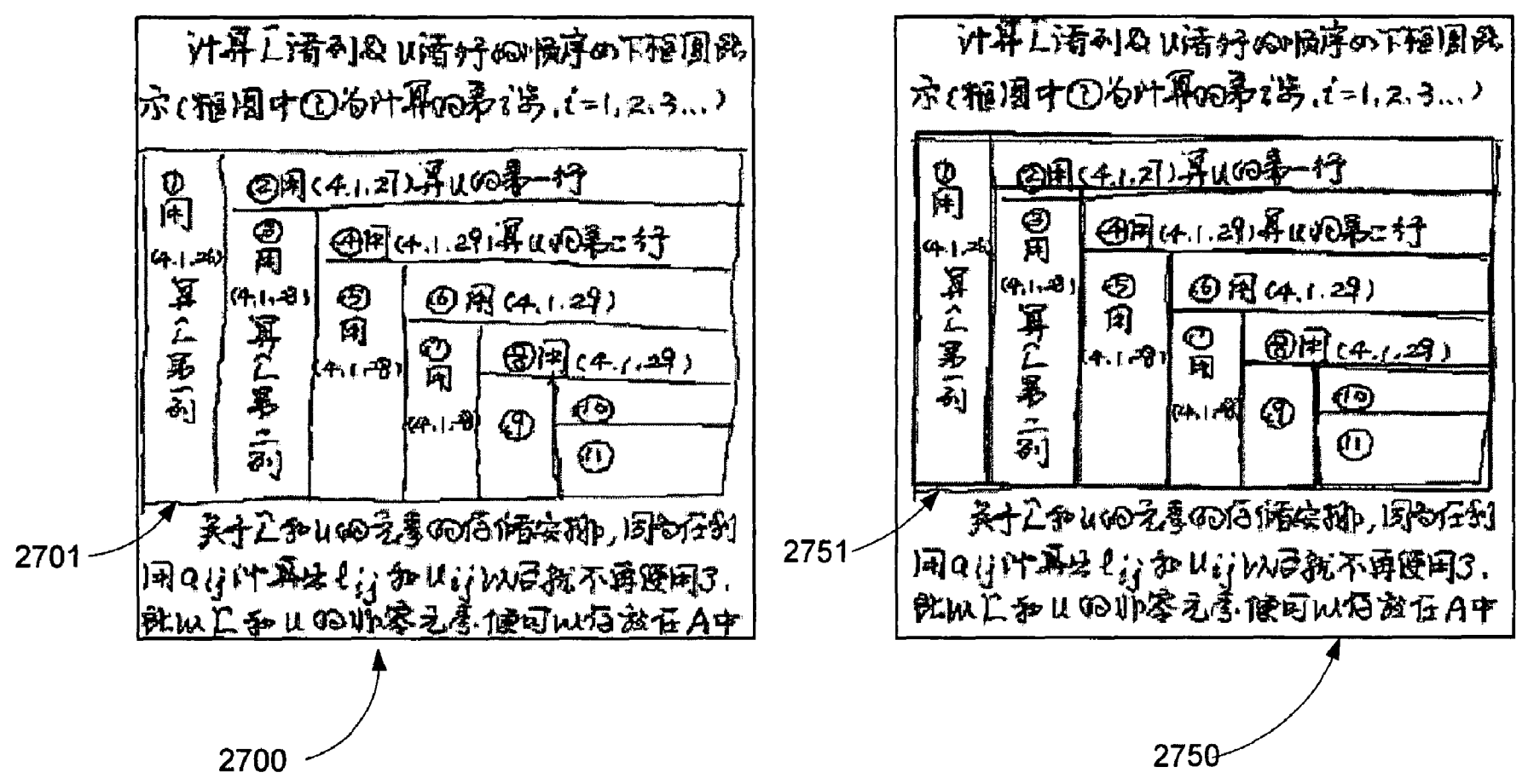
Figure 28:
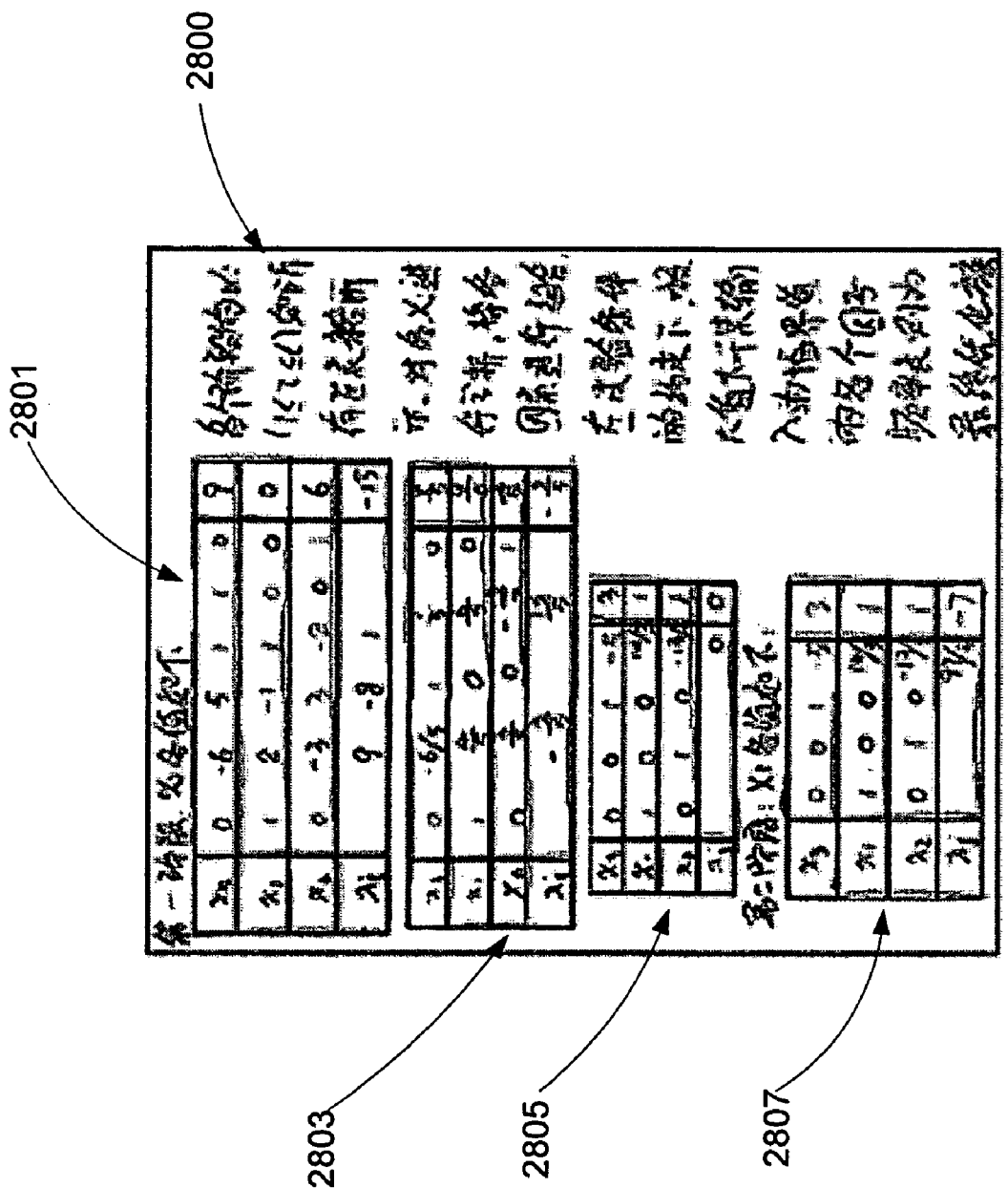
FIG. 28 shows an example of detecting multiple tables in accordance with an illustrative aspect of the present invention.

FIG. 25 shows detection result 2500 of a handwritten document in accordance with an illustrative aspect of the present invention. As highlighted in FIG. 25, tables 2501, 2503, and 2505 have been correctly detected by table detector 505. FIG. 26 shows an example of table detection in accordance with an illustrative aspect of the present invention. Table 2601 of handwritten document 2600 is correctly detected in processed document 2650 as detected table 2651 as highlighted. FIG. 27 shows an example of table detection in accordance with an illustrative aspect of the present invention. Table 2701 of handwritten document 2700 is correctly detected in processed document 2750 as detected table 2751 as highlighted. Moreover, embodiments of the invention can detect a plurality of handwritten tables within a document. FIG. 28 shows example 2800 of detecting multiple tables 2801-2807 in accordance with an illustrative aspect of the present invention.

Testing data set has 378 ink notes, which contains 195 handwritten documents written in English, 84 in Chinese, 44 in French and 55 in German. Many ink notes are of multiple pages. Ink notes were collected from many different people without any restriction on the style of writing the documents. The ink notes may contain text, graphic, diagram, flow chart, tables and so on. Tables can be drawn at random, whatever the size and skewness.

The evaluation of table detection is often difficult because of a different grouping or different structure between the detected structured graphical object and the actual structured graphical object. A grouping difference refers to different grouping of the component. For example, when several tables are too close to each other, then the tables can be detected as a single table, or multiple tables, or even several tables plus several non-tables. A structural difference refers to different relationship among the component. For example, the set of frame lines for a table is identical to that of the actual table, but the intersection relationship between frame lines is different, resulting in different tables. These difficulties make correct alignment of the detected table and the actual table a challenging consideration. Therefore, human inspection may be the only resort.

Editing after Table Detection

After table structure information is extracted, table editing can be performed, such as rotation, scaling, moving the whole table, alignment of cell content, transformation to char, etc. Some table editing examples of the ink parser demonstration system (corresponding to apparatus 500) are shown in FIGS. 29-32. FIG. 29 shows skewed table 2901 in handwritten document 2900 in accordance with an illustrative aspect of the present invention. FIG. 30 shows editing the skewed table, as shown in FIG. 29, by horizontally rearranging table 3001 of processed document 3000 in accordance with an illustrative aspect of the present invention. FIG. 31 shows further editing of skewed table 2901 by moving frame lines 3103-3105 to form edited table 3101 of processed document 3100 in accordance with an illustrative aspect of the present invention.

Figure 32:
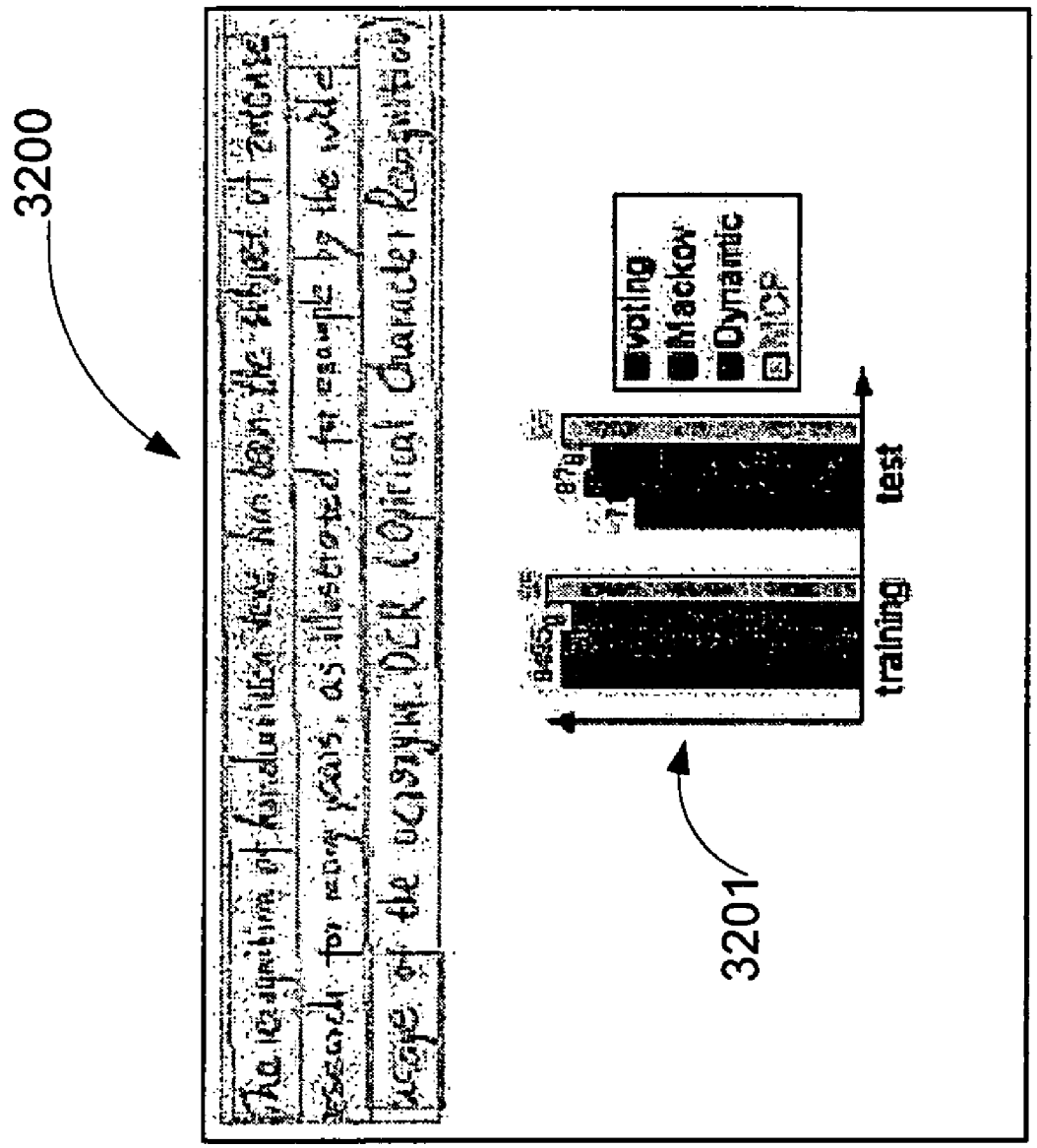
FIG. 32 shows a transformation of the tables that are shown FIGS. 29-31 to form a chart in accordance with an illustrative aspect of the present invention.

Handwritten tables may be edited to facilitate viewing by a user. Moreover, the contents of a handwritten table may be ported to a software application to transform the contents into another structured object (e.g., chart 3201 as shown in FIG. 32). FIG. 32 shows a transformation of the tables that are shown FIGS. 29-31 to form chart 3201 in accordance with an illustrative aspect of the present invention.

Framework for Detecting a Structured Handwritten Object

Figure 33:
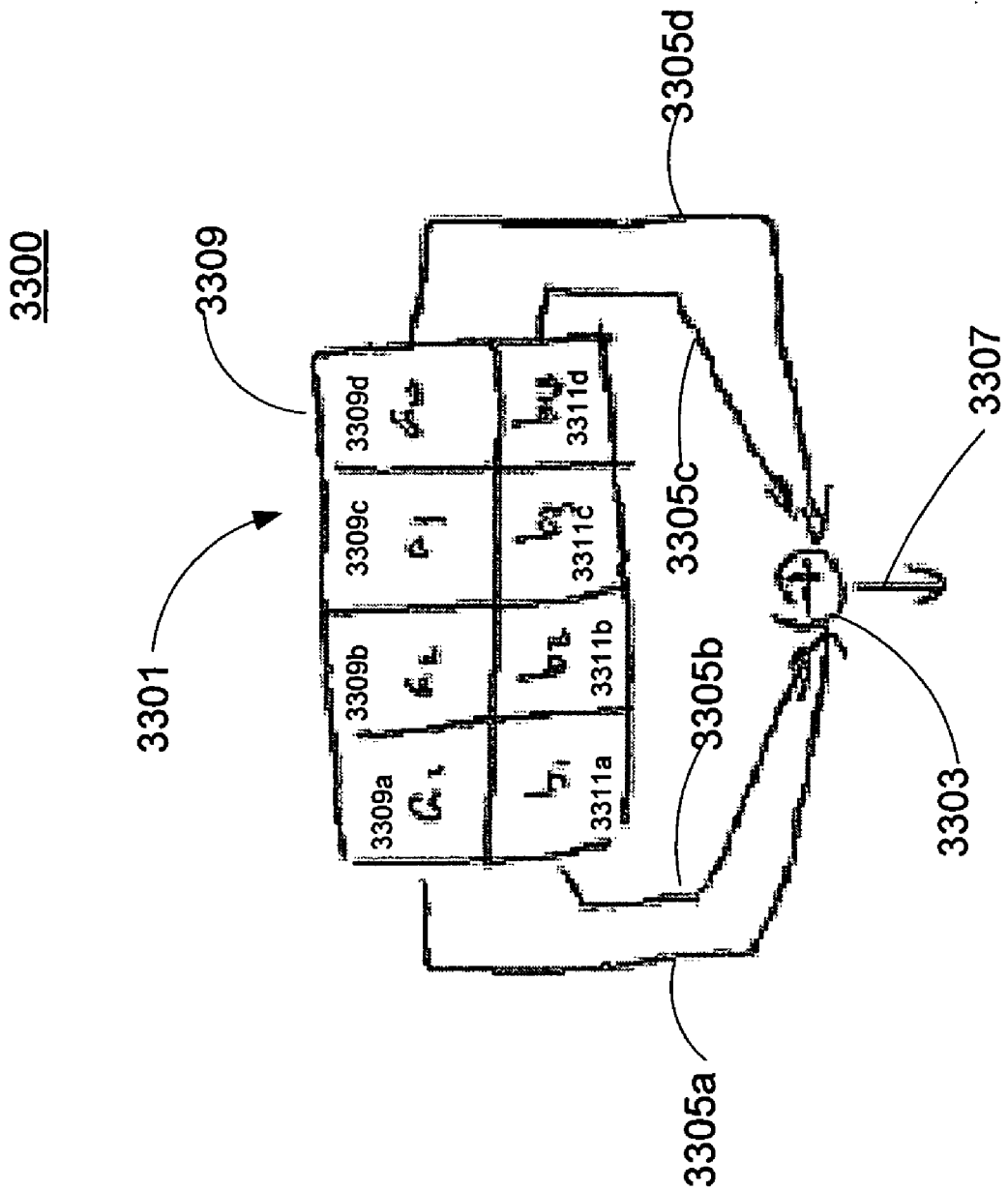
FIG. 33 shows a structured handwritten object that is detected by an object detection framework in accordance with an illustrative aspect of the present invention.

FIG. 33 shows structured handwritten object 3300 that is detected by an object detection framework in accordance with an illustrative aspect of the present invention.

As previously discussed, embodiments of the invention provides a robust table detection system that is capable of extracting free style tables from on-line handwritten documents. Table detection is typically a challenging task in that the ruling lines and layout of hand-drawn tables are often far more irregular and complex than those of printed tables. Embodiments of the invention may be extended and applied to other structured handwritten objects, such as flowcharts, organization charts, bar or pie graphs, and annotations, which have structures that can be defined without ambiguity. For example, because a primitive structure of a structured graphical object comprises component objects (e.g., directed lines, rectangles, and circles as shown with structural graphical object 3300), a structured graphical object detector can detect a structured graphical object with appropriate modifications in detecting the primitive structure and logical structure in relation to table detector 505. Line segments may be generalized by curvilinear segments. For example, a circle may be formed from one or more strokes from which arched segments may be obtained.

Embodiments of the invention provide a framework for detecting a structured handwritten object. For example, detection apparatus, which may be based on apparatus 500 as shown in FIG. 5) supports the following features (capabilities):

Detecting a primitive structure—A structured graphical object typically comprises primitive structure. For example, as previously discussed, a table includes component objects such as ruling lines and a bounding box. The associated functionality corresponds to the functionality previously discussed with preprocessing and detecting a bounding frame. When detecting the primitive structure, a histogram (relating segments with associated directions) may be examined for peaks in which segments have a different orientation other than a horizontal or vertical orientation, e.g., segments may have a diagonal orientation for triangular or diamond-shaped objects.

Detecting a logical structure from the primitive structure—When detecting a logical structure, a relationship among component objects is determined. For example, referring to structured handwritten object 3300, known rules may indicate that at least two directed line should exist between the rectangle (which may represent a memory location having a plurality of memory cells) and the circle (which may represent a combination element). Moreover, embodiments of the invention may support other types of structured handwritten objects by expanding parse tree 2400 by including other structured object types, e.g., drawing object 2409, as shown in FIG. 24. The associated functionality corresponds to the functionality previously discussed with quasi-table formation, table structure recognition, and the analysis of cell content.

Overall detection and classification—The detection of a structured handwritten object is typically hierarchical and procedural as previously discussed. If an overall confidence level (classifier) is sufficiently large, the structured graphical object is detected. The associated functionality corresponds to the functionality previously discussed with the determination of a classifier.

As there are many parameters and thresholds in a structured handwritten object detector, currently only a subset of the parameters and thresholds is manually tuned on specially designed test pages which have a dense population of tables/non-tables on each page to facilitate quick human examination of detection accuracy and speed. Some of the parameters and thresholds may have significant influence on the accuracy and speed. The remaining parameters and thresholds are fixed to estimated values. As long as the thresholds are not excessively large, the final classifier essentially determines the detection accuracy. Moreover, it is possible to develop an automatic parameter tuning system, e.g., using the genetic algorithm, to automatically find the optimal parameters and thresholds in full scale, where the detection speed is considered in order to achieve desired performance objectives.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable medium storing computer-executable instructions that, when executed, cause one or more processors to perform steps comprising:
    (a) forming a primitive structure from a handwritten document, the primitive structure being associated with a set of component objects;
    (b) detecting a logical structure of a candidate handwritten object from the set of component objects;
    (c) determining a classifier for the candidate handwritten object; and
    (d) validating the candidate handwritten object from the classifier to obtain a validated handwritten object.

2. The computer-readable medium of claim 1, wherein the computer-executable instructions, when executed, cause the one or more processors to form the primitive structure from a handwritten document further include:
    obtaining a list of curvilinear segments from a portion of the handwritten document; and
    constructing the primitive structure from the list of curvilinear segments.

3. The computer-readable medium of claim 2, wherein the computer-executable instructions, when executed, cause the one or more processors to form the primitive structure from a handwritten document further include:
    obtaining a drawing stroke that is approximated by curvilinear segments; and
    including the curvilinear segments into the list of curvilinear segments.

4. The computer-readable medium of claim 2, wherein the computer-executable instructions, when executed, cause the one or more processors to form the primitive structure from a handwritten document further include:
    when a drawing stroke is approximated by a plurality of curvilinear segments, including the plurality of curvilinear segments into the primitive structure.

5. The computer-readable medium of claim 2, wherein the computer-executable instructions, when executed, cause the one or more processors to form the primitive structure from a handwritten document further include:
    constructing a histogram from the list of curvilinear segments; and
    determining an orientation of the primitive structure from the histogram.

6. The computer-readable medium of claim 1, further storing computer-executable instructions that, when executed, cause the one or more processors to further perform:
    generating a semantic object from the validated handwritten object.

7. The computer-readable medium of claim 1, further storing computer-executable instructions that, when executed, cause the one or more processors to further perform:
    editing the validated table from a command input.

8. The computer-readable medium of claim 1, the classifier comprising a linear combination of classifier components.

9. The computer-readable medium of claim 8, one of the classifier components comprising a structural confidence level of the logical structure of the candidate handwritten object.

10. The computer-readable medium of claim 8, one of the classifier components comprising to a normalization confidence level.

11. The computer-readable medium of claim 8, one of the classifier components comprising a content confidence level.

12. The computer-readable medium of claim 1, wherein the computer-executable instructions, when executed, cause the one or more processors to detect the logical structure of the candidate handwritten object further include:
    normalizing a component object by replacing the component object with a structurally consistent component object.

13. The computer-readable medium of claim 1, wherein the computer-executable instructions, when executed, cause the one or more processors to form the primitive structure from a handwritten document, further include:
    combining a plurality of curvilinear segments to form a component object.

14. The computer-readable medium of claim 1, further storing computer-executable instructions that, when executed, cause the one or more processors to further perform:
    analyzing content in the candidate handwritten object to determine a content confidence level.

15. A handwritten object detector that detects a structured handwritten object in a handwritten document, the handwritten object detector comprising:
    a preprocessor that forms a list of curvilinear segments from a portion of the handwritten document and constructs a set of component objects from the list of curvilinear segments;
    a feature extractor that obtains a logical structure of a candidate handwritten object from the set of component objects, analyzes content within the candidate table, and determines confidence levels associated with the logical structure and the content; and
    a classification module that forms a classifier from the confidence levels and that determines whether the candidate table corresponds to a validated handwritten object when the classifier is larger than a predetermined threshold.

16. The handwritten object detector of claim 15, the classification module outputting a semantic object when the classifier is larger than the predetermined threshold.

17. The handwritten object detector of claim 15, further comprising:
    an editing module that modifies the validated handwritten object in accordance with an editing command.

18. The handwritten object detector of claim 15, the classification module instructing the preprocessor to form another list of curvilinear segments from another portion of the handwritten document when the classifier is less than the predetermined threshold.

19. The handwritten object detector of claim 15, further comprising:
    a transformation module that transforms the validated handwritten object into another structured object.

20. A computer-readable medium having computer-executable instructions for performing steps comprising:
    (a) forming a primitive structure from a handwritten document, the primitive structure being associated with a set of component objects;
    (b) normalizing a component object by replacing the component object with a structurally consistent component object,
    (c) obtaining a logical structure of a candidate handwritten object from the set of component objects and a structural confidence level that corresponds to the logical structure;
    (d) analyzing content in the candidate handwritten object to determine a content confidence level;
    (e) determining a linear classifier for the candidate handwritten object from the structural confidence level and the content confidence level;
    (f) validating the candidate handwritten object from the linear classifier; and
    (g) outputting a semantic object from the candidate handwritten object when the linear classifier is greater than a predetermined threshold.

\* \* \* \* \*